(12) United States Patent
Hipshier et al.

(10) Patent No.: US 10,926,707 B2
(45) Date of Patent: Feb. 23, 2021

(54) VEHICLE INTERIOR COMPONENT

(71) Applicant: Shanghai Yanfeng Jinqiao Automotive Trim Systems Co. Ltd., Novi, MI (US)

(72) Inventors: Jason Mathew Hipshier, Holland, MI (US); David John McCarthy, Holland, MI (US); Amit Mukund Patankar, Holland, MI (US); Ronald A. Bozio, Holland, MI (US); Chris J. Harmelink, Wyoming, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 161 days.

(21) Appl. No.: 16/236,217

(22) Filed: Dec. 28, 2018

(65) Prior Publication Data

US 2019/0136611 A1 May 9, 2019

Related U.S. Application Data

(63) Continuation of application No. PCT/US2018/039612, filed on Jun. 26, 2018.
(Continued)

(51) Int. Cl.
*B60R 7/04* (2006.01)
*B60R 5/00* (2006.01)
(Continued)

(52) U.S. Cl.
CPC ............... *B60R 7/04* (2013.01); *B60N 2/793* (2018.02); *B60R 5/00* (2013.01); *B60R 7/00* (2013.01);
(Continued)

(58) Field of Classification Search
CPC ..... B60R 7/04; B60R 7/06; B60R 2011/0007; B60R 2011/0094; E06B 9/13; E06B 9/11; E06B 9/08; E06B 2009/135
(Continued)

(56) References Cited

U.S. PATENT DOCUMENTS

| 1,490,538 A | 4/1924 | Owen |
| 2,000,162 A | 5/1935 | Buscham |

(Continued)

FOREIGN PATENT DOCUMENTS

| CN | 1672982 A | 9/2005 |
| CN | 1898107 A | 1/2007 |

(Continued)

OTHER PUBLICATIONS

International Search Report and Written Opinion for International Application No. PCT/US2018/039612 dated Aug. 30, 2018, 11 pages.

*Primary Examiner* — Dennis H Pedder

(74) *Attorney, Agent, or Firm* — Amin, Turocy & Watson, LLP

(57) ABSTRACT

A vehicle interior component is disclosed. The component may comprise a base providing a compartment with an opening, a door moveable between open and closed positions and an interface between the base and the door to facilitate movement of the door. The interface may comprise a set of projections on the door to engage a set of guides on the base. The set of projections may comprise a set of extrusions. The door may comprise a substrate and a cover layer; the substrate may be formed by extrusion. The component may comprise at least one of a vehicle trim component, a console, a center console, a floor console, a storage compartment, an arm rest. A method of making a component is also disclosed. The component may comprise a base and a door comprising a cover and a carrier. The carrier may be formed by extruding a polymer material.

19 Claims, 18 Drawing Sheets

Related U.S. Application Data

(60) Provisional application No. 62/525,515, filed on Jun. 27, 2017, provisional application No. 62/525,560, filed on Jun. 27, 2017.

(51) Int. Cl.
  *B60R 21/00* (2006.01)
  *B60R 7/00* (2006.01)
  *B60N 2/75* (2018.01)
  *B60R 11/00* (2006.01)
  *E06B 9/11* (2006.01)
  *E06B 9/13* (2006.01)

(52) U.S. Cl.
  CPC .............. *B60R 11/00* (2013.01); *B60R 21/00* (2013.01); *E06B 9/115* (2013.01); *E06B 9/13* (2013.01); *B60R 2011/0007* (2013.01); *B60R 2011/0094* (2013.01); *E06B 2009/135* (2013.01)

(58) Field of Classification Search
  USPC .............................................. 296/24.34, 37.8
  See application file for complete search history.

(56) References Cited

U.S. PATENT DOCUMENTS

| | | | |
|---|---|---|---|
| 2,064,470 A | 12/1936 | Heckman | |
| 2,571,715 A | 9/1949 | Henning | |
| 2,573,962 A | 11/1951 | Fox et al. | |
| 2,797,739 A | 7/1957 | Orsini | |
| 3,237,824 A | 3/1966 | Gunckel | |
| 3,449,011 A | 6/1969 | Edwards et al. | |
| 3,460,878 A | 8/1969 | Peterson et al. | |
| 3,615,118 A | 10/1971 | Buxton | |
| 3,717,247 A | 2/1973 | Moore | |
| 3,814,493 A | 6/1974 | Radke | |
| 3,870,391 A | 3/1975 | Nims | |
| 3,951,448 A | 4/1976 | Hawie | |
| 4,157,845 A | 6/1979 | Queveau | |
| 4,923,244 A | 5/1990 | Clenet | |
| 4,934,750 A | 6/1990 | Eichler et al. | |
| 5,169,699 A | 12/1992 | Prince | |
| 5,216,035 A | 6/1993 | Harrison et al. | |
| 5,266,234 A | 11/1993 | Ho et al. | |
| 5,320,048 A * | 6/1994 | Feiner | B65D 19/0016 108/51.11 |
| 5,322,344 A | 6/1994 | Hoffman et al. | |
| 5,389,693 A | 2/1995 | DeGenova et al. | |
| 5,494,329 A | 2/1996 | Gonzalez et al. | |
| 5,556,017 A | 9/1996 | Troy | |
| 5,562,331 A | 10/1996 | Spykerman et al. | |
| 5,752,740 A | 5/1998 | Volkmann et al. | |
| 5,803,563 A | 9/1998 | Woodward | |
| 5,921,029 A | 7/1999 | Stukerjurgen | |
| 6,217,112 B1 | 4/2001 | Linsenmeier et al. | |
| 6,231,940 B1 | 5/2001 | Aichner et al. | |
| 6,398,890 B1 | 6/2002 | Spoerle | |
| 6,422,672 B1 | 7/2002 | Searer | |
| 6,478,204 B2 | 11/2002 | Iange et al. | |
| 6,499,785 B2 | 12/2002 | Eguchi | |
| 6,558,497 B2 | 5/2003 | Franco et al. | |
| 6,602,579 B2 | 8/2003 | Landvik | |
| 6,672,554 B2 | 1/2004 | Fukuo | |
| 6,699,349 B1 | 3/2004 | Spörle et al. | |
| 6,845,032 B2 | 1/2005 | Toyoda et al. | |
| 6,883,852 B2 | 4/2005 | Laskey | |
| 6,953,612 B2 | 10/2005 | Spoerle | |
| 7,087,842 B2 | 8/2006 | Belli et al. | |
| 7,231,841 B2 | 6/2007 | Ueki | |
| 7,287,795 B1 | 10/2007 | Thomas | |
| 7,341,297 B2 | 3/2008 | Nakamura et al. | |
| 7,343,956 B2 | 3/2008 | Schleef et al. | |
| 7,475,954 B1 * | 1/2009 | Latunski | B60R 11/00 296/24.34 |
| 7,575,266 B2 | 8/2009 | Sato | |
| 7,581,773 B2 | 9/2009 | Strasser et al. | |
| 7,588,280 B2 | 9/2009 | Dobos et al. | |
| 7,591,499 B2 | 9/2009 | Jonischkeit | |
| 7,597,130 B2 | 10/2009 | Ichimaru et al. | |
| 7,686,992 B2 | 3/2010 | Sato | |
| 7,721,926 B2 | 5/2010 | Thomas | |
| 7,735,538 B2 | 6/2010 | Ogawa | |
| 7,753,426 B2 | 7/2010 | Sato | |
| 7,794,000 B2 | 9/2010 | Ichimaru | |
| 8,925,616 B2 | 1/2015 | Ganz | |
| 9,085,265 B2 | 7/2015 | Hipshier | |
| 2001/0021438 A1 | 9/2001 | Landvik | |
| 2004/0003890 A1 | 1/2004 | Bauer et al. | |
| 2004/0029030 A1 | 2/2004 | Murray | |
| 2004/0118851 A1 | 6/2004 | Shinomiya | |
| 2004/0130174 A1 | 7/2004 | Laskey | |
| 2005/0098257 A1 | 5/2005 | Bauer et al. | |
| 2005/0194825 A1 | 9/2005 | Kurz et al. | |
| 2005/0276874 A1 | 12/2005 | Menaldo et al. | |
| 2006/0037713 A1 * | 2/2006 | Ichimaru | B60R 11/00 160/37 |
| 2006/0066118 A1 | 3/2006 | Radu et al. | |
| 2006/0186696 A1 | 8/2006 | Dobos et al. | |
| 2006/0279106 A1 | 12/2006 | Strasser et al. | |
| 2007/0125500 A1 | 6/2007 | Gosling et al. | |
| 2008/0084083 A1 | 4/2008 | Boddie et al. | |
| 2008/0129071 A1 | 6/2008 | Hipshier et al. | |
| 2011/0272962 A1 | 11/2011 | Bailey et al. | |
| 2012/0305202 A1 | 12/2012 | Ganz | |
| 2014/0167435 A1 | 6/2014 | Sherburn | |
| 2015/0258939 A1 * | 9/2015 | Hipshier | B60R 7/04 160/229.1 |

FOREIGN PATENT DOCUMENTS

| | | | |
|---|---|---|---|
| DE | 71 03 089 U | 8/1971 | |
| DE | 25 45 308 A1 | 4/1977 | |
| DE | 38 07 880 A1 | 9/1989 | |
| DE | 40 10 241 A1 | 4/1991 | |
| DE | 40 15 872 C1 | 1/1992 | |
| DE | 42 25 880 A1 | 2/1993 | |
| DE | 42 20 670 C2 | 4/1994 | |
| DE | 94 03 833 U1 | 6/1994 | |
| DE | 43 09 620 A1 | 9/1994 | |
| DE | 296 00 783 U1 | 4/1996 | |
| DE | 195 24 177 C1 | 8/1996 | |
| DE | 196 54 246 A1 | 6/1998 | |
| DE | 198 22 425 C1 | 2/2000 | |
| DE | 199 09 642 C1 | 4/2000 | |
| DE | 199 23 512 A1 | 12/2000 | |
| DE | 100 23 778 A1 | 11/2001 | |
| DE | 20 2004 006 649 U1 | 9/2004 | |
| DE | 196 46 809 B4 | 4/2006 | |
| DE | 10 2008 018 557 A1 | 10/2009 | |
| DE | 10 2009 057 783 A1 | 6/2011 | |
| DE | 102015016011 | 6/2017 | |
| EP | 0 148 619 B1 | 9/1987 | |
| EP | 0 295 587 A2 | 12/1988 | |
| EP | 0 438 858 A2 | 7/1991 | |
| EP | 0 264 785 B1 | 1/1994 | |
| EP | 0 428 844 B1 | 6/1994 | |
| EP | 0 587 014 B1 | 4/1996 | |
| EP | 0 604 375 B1 | 5/1996 | |
| EP | 0 626 291 B1 | 10/1996 | |
| EP | 0 730 993 B1 | 6/1999 | |
| EP | 0 958 964 A1 | 11/1999 | |
| EP | 0 850 806 B1 | 5/2002 | |
| EP | 0 960 778 B1 | 11/2003 | |
| EP | 1 580 077 A1 | 9/2005 | |
| EP | 1 600 330 A1 | 11/2005 | |
| EP | 1 148 204 B1 | 7/2006 | |
| EP | 1 690 740 A1 | 8/2006 | |
| FR | 2439078 * | 5/1980 | E06B 9/13 |
| GB | 599652 A | 3/1948 | |
| JP | S58-128942 A | 8/1983 | |
| JP | S63-103451 A | 5/1988 | |
| JP | H04-081384 A | 3/1992 | |
| JP | H08-192685 A | 7/1996 | |

(56) References Cited

FOREIGN PATENT DOCUMENTS

| | | |
|---|---|---|
| JP | H09-20176 A | 1/1997 |
| JP | H09-193953 A | 7/1997 |
| JP | H10-217855 A | 8/1998 |
| JP | 3942071 B2 | 7/2007 |
| KR | 10-0465110 B1 | 1/2005 |
| WO | 01/25583 A1 | 4/2001 |
| WO | 2005/042868 | 5/2005 |
| WO | 2008/064210 A2 | 5/2008 |
| WO | 2011/069682 A1 | 6/2011 |

* cited by examiner

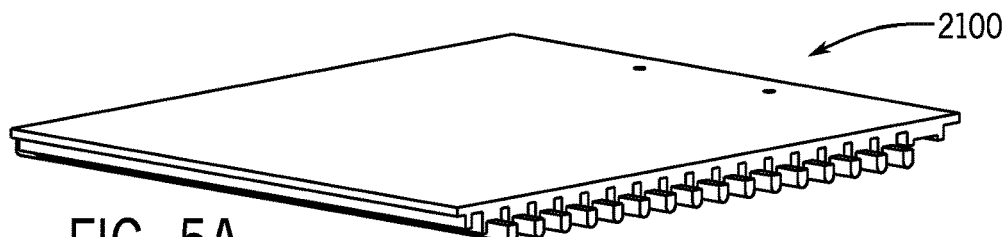
FIG. 5A
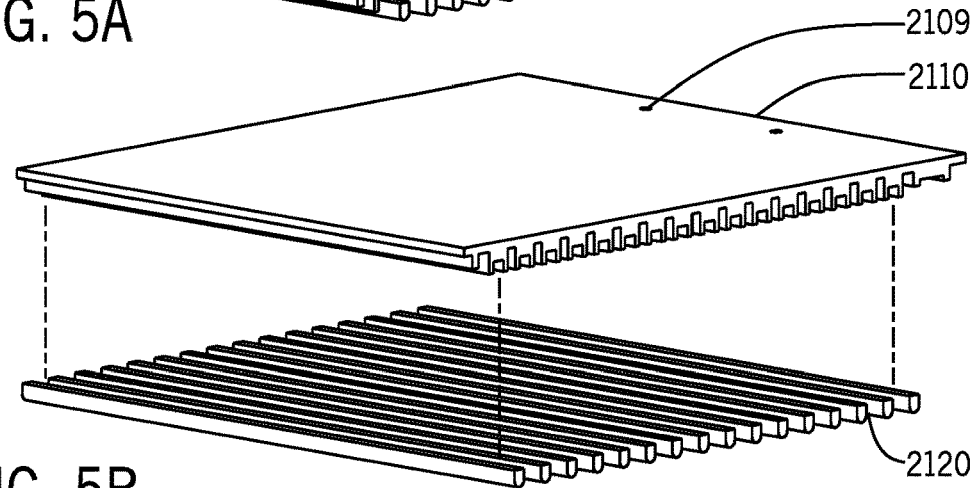
FIG. 5B
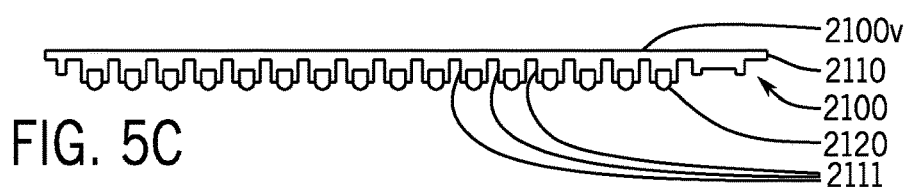
FIG. 5C
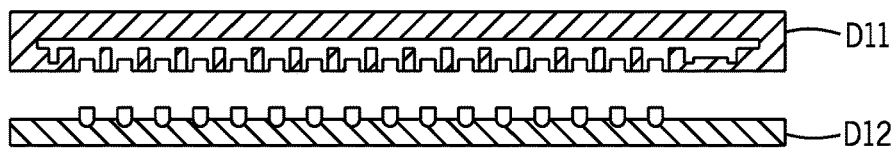
FIG. 5D
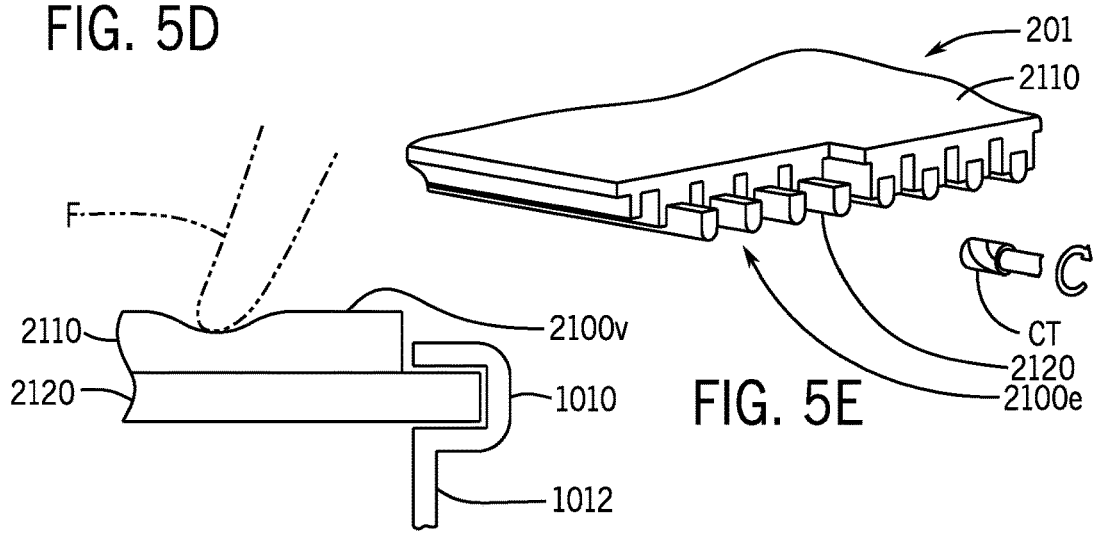
FIG. 5E
FIG. 5F

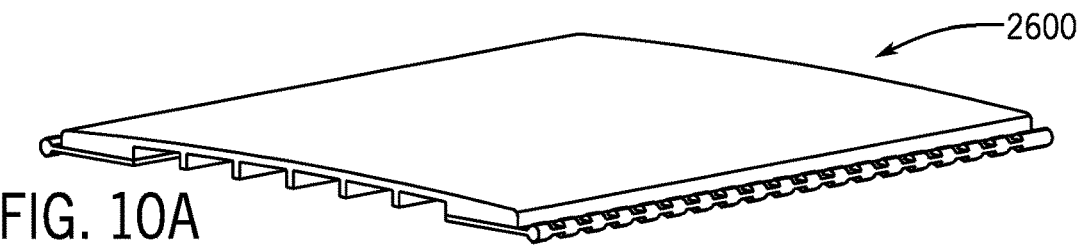
FIG. 10A
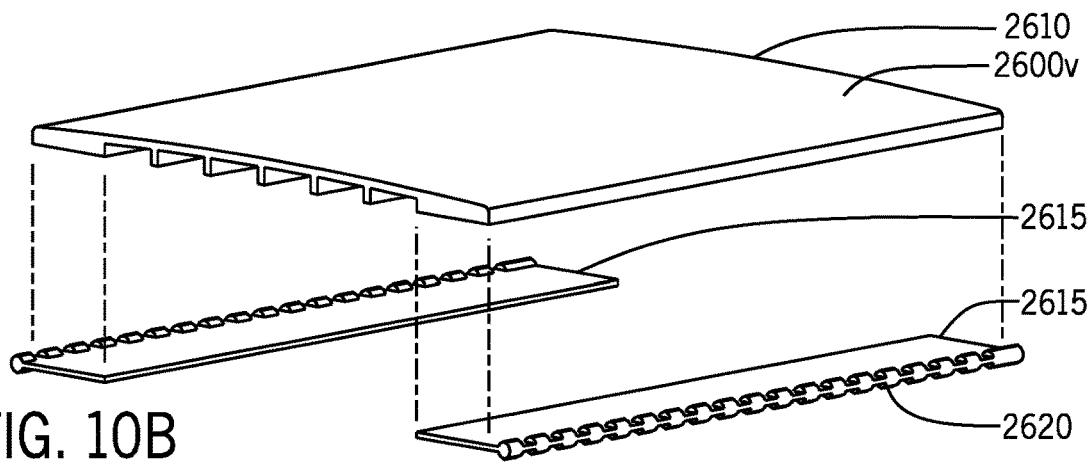
FIG. 10B
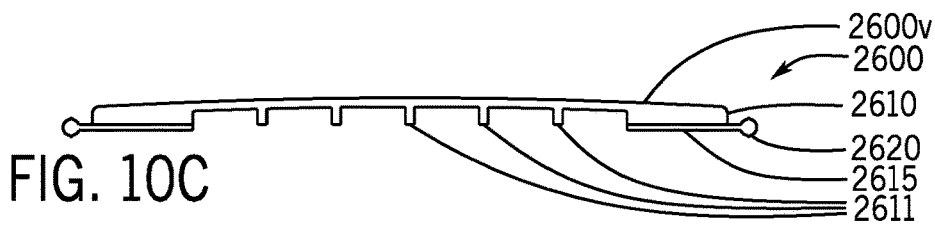
FIG. 10C
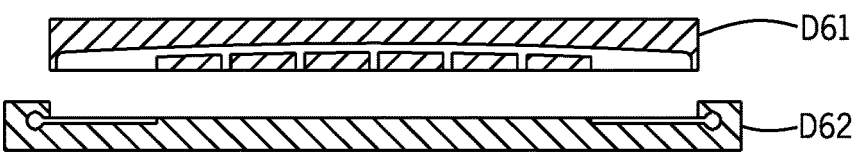
FIG. 10D
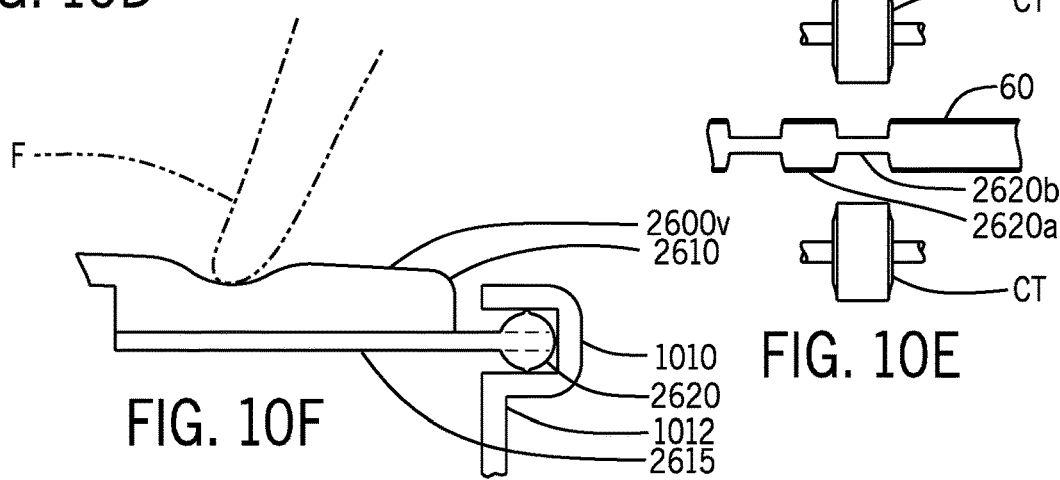
FIG. 10E
FIG. 10F

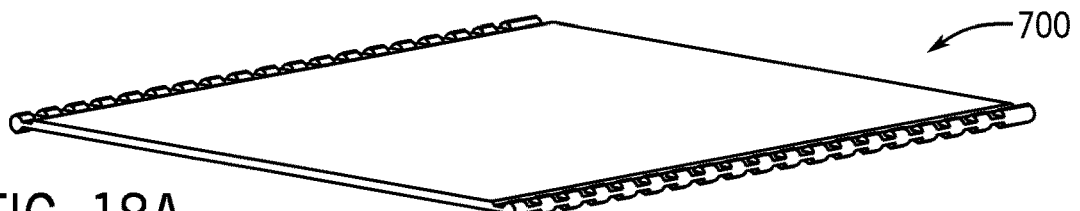
FIG. 18A
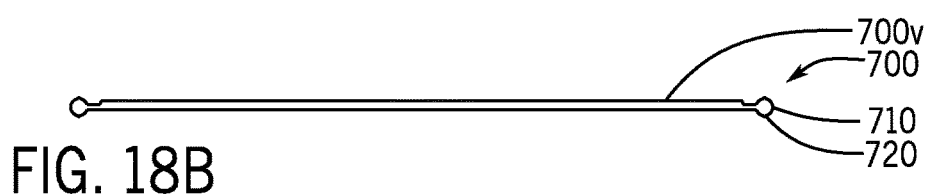
FIG. 18B
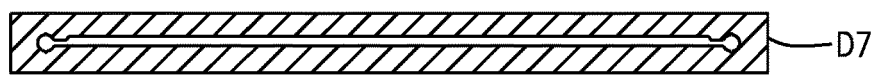
FIG. 18C
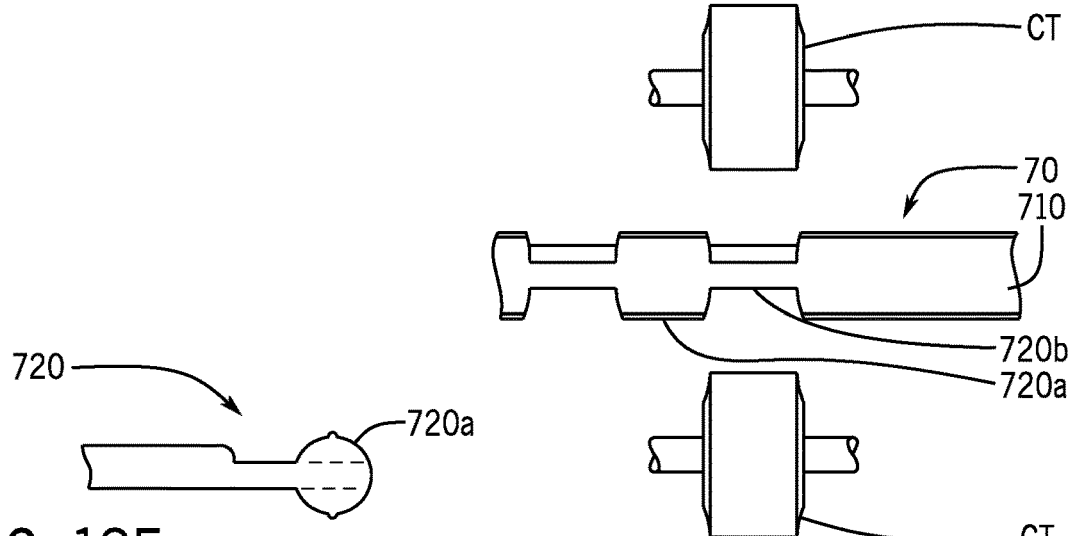
FIG. 18D
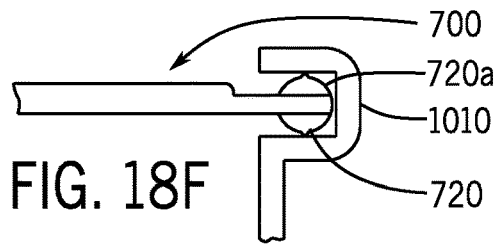
FIG. 18E
FIG. 18F

VEHICLE INTERIOR COMPONENT

CROSS-REFERENCE TO RELATED APPLICATIONS

The present application is a continuation of International/PCT Patent Application No. PCT/US18/39612 titled "VEHICLE INTERIOR COMPONENT" filed Jun. 26, 2018, which claims the benefit of U.S. Provisional Patent Application No. 62/525,515 titled "COMPONENT FOR VEHICLE INTERIOR" filed Jun. 27, 2017 and U.S. Provisional Patent Application No. 62/525,560 titled "COMPONENT FOR VEHICLE INTERIOR" filed Jun. 27, 2017.

The present application claims priority to and incorporates by reference in full the following patent application(s): (a) U.S. Provisional Patent Application No. 62/525,515 titled "COMPONENT FOR VEHICLE INTERIOR" filed Jun. 27, 2017; (b) U.S. Provisional Patent Application No. 62/525,560 titled "COMPONENT FOR VEHICLE INTERIOR" filed Jun. 27, 2017; (c) International/PCT Patent Application No. PCT/US18/39612 titled "VEHICLE INTERIOR COMPONENT" filed Jun. 26, 2018.

FIELD

The present invention relates to a vehicle interior component.

The present invention also relates to vehicle interior component in the form of a console providing an improved door for a compartment.

The present invention also relates to a method of making a component for a vehicle interior.

BACKGROUND

It is known to provide a vehicle interior with a component such as a console having a compartment with a door configured for movement relative to the base to an open position to facilitate access through the opening into the compartment of the base.

It would be advantageous to provide an improved vehicle interior component such as a console with a door. It would also be advantageous to provide a door for a vehicle interior component configured for improved efficiency of manufacture/production and in design/use in the vehicle interior component.

SUMMARY

The present invention relates to a vehicle interior component. The vehicle interior component may comprise a base providing a compartment with an opening and a door configured for movement relative to the base to an open position to facilitate access through the opening into the compartment of the base; an interface may be provided between the base and the door configured to facilitate movement of the door relative to the base; the interface may comprise a set of projections on the door configured to engage a set of guides on the base. The set of projections may comprise a set of extrusions.

The set of projections may comprise a first projection and a second projection; the first projection may comprise a cross section; the cross section of the first projection may be substantially constant throughout the first projection. The set of projections may be formed by extrusion. The set of projections may be formed by extruding a polymer material in a direction substantially perpendicular to a path of movement of the door relative to the base. The set of projections may be formed by extruding a polymer material in a direction substantially parallel to a path of movement of the door relative to the base. The door may be formed by extrusion and the set of projections may be formed by a cutting operation. The door may comprise a set of openings; the set of projections may be coupled to the door at the set of openings. The door may comprise a set of channels; the set of projections may extend through the set of channels. The door may comprise at least one of a set of apertures or a set of grooves; the set of projections may be inserted into the at least one of the set of apertures or the set of grooves. The door may comprise a substrate and a cover layer.

The substrate may comprise an extrusion; the cover layer may comprise an extrusion. The substrate and the cover layer may be formed by co-extrusion. The cover layer may be bonded to the substrate as the substrate is extruded. The substrate and cover layer may be integrally formed. The cover layer may be bonded to the substrate. The substrate may comprise a cross section; the cross section of the substrate may be substantially constant. The substrate may comprise the set of projections; the set of projections may comprise a first projection and a second projection; the cover layer may couple the first projection to the second projection. The substrate may be formed by extrusion. The substrate may be bonded to the cover layer as the substrate is extruded.

The door may be prepared by a process comprising extruding a material to form an extruded substrate. The process may comprise the step of removing a portion of the extruded substrate to form the set of projections.

The set of projections may comprise at least one of (a) a set of projections formed on the door; (b) a set of pins formed on the door; (c) a set of posts formed on the door; (d) a set of members formed on the door; (e) a set of features formed on the door; (f) a set of pegs formed on the door; (g) a rim formed on the door; (h) a support formed on the door; (i) a flange formed on the door.

The set of projections may comprise at least one of (a) a set of projections integrally formed on the door; (b) a set of pins integrally formed on the door; (c) a set of posts integrally formed on the door; (d) a set of members integrally formed on the door; (e) a set of features integrally formed on the door; (f) a set of pegs integrally formed on the door; (g) a rim integrally formed on the door; (h) a support integrally formed on the door; (i) a flange integrally formed on the door.

The door may comprise a door assembly. The door assembly may comprise at least one of (a) a cover and a substrate; (b) a cover and a base; (c) a cover structure and a carrier structure; (d) a cover and a carrier structure; (e) a base structure comprising a cover and a substrate comprising the set of projections; (f) a cover and a base structure formed by co-extrusion; (g) a cover and a carrier structure formed by co-extrusion; (h) a cover and a carrier formed by co-extrusion; (i) a cover coupled to a carrier formed by extrusion.

The present invention relates to a method of making a component for a vehicle interior comprising a base and a door configured for movement relative to the base to an open position to facilitate access through the opening into a compartment of the base and a set of projections on the door configured to engage a set of guides on the base comprising the step of forming the door by extrusion of polymer material through a tool.

The door may comprise a cover and a carrier configured to provide the set of projections. The method may further comprise the step of forming the set of projections on the carrier. The method may further comprise the step of attaching the set of projections to the carrier.

The step of forming the door may comprise extruding a polymer material to form a cover. The step of forming the door may comprise extruding a first polymer material to form a carrier and extruding a second polymer material to form a cover. The step of forming the door may comprise extruding the first polymer material in a first direction to form the carrier and extruding the second polymer material in a second direction to form the cover. The door may comprise a cover and a carrier configured to provide the set of projections; forming the door may comprise extruding a polymer material to form the carrier. The step of forming the door may comprise bonding the cover to the carrier.

The present invention relates to a vehicle interior component. The vehicle interior component may comprise a base providing a compartment with an opening and a door configured for movement relative to the base to an open position to facilitate access through the opening into the compartment of the base and an interface between the base and the door configured to facilitate movement of the door relative to the base The interface may comprise a set of projections on the door configured to engage a set of guides on the base; the door may comprise a carrier configured to provide the set of projections and a cover. The door may be formed by extrusion. The set of projections may be formed on the carrier. The carrier may be formed by extrusion of a polymer material. The cover may be formed by extrusion of a polymer material. The door may be formed by attachment of the cover to the carrier. The door may be formed by co-extrusion of the cover and the carrier. The cover and the carrier may be integrally formed. The cover may be bonded to the carrier. The set of projections may be formed by extrusion of the carrier. The set of projections may be formed by machining of the carrier. The set of projections may be attached to the carrier.

The set of projections may comprise at least one of (a) a set of projections formed on the carrier; (b) a set of pins formed on the carrier; (c) a set of posts formed on the carrier; (d) a set of members formed on the carrier; (e) a set of features formed on the carrier; (f) a set of pegs formed on the carrier; (g) a rim formed on the carrier; (h) a support formed on the carrier; (i) a set of supports formed on the carrier; (j) a flange formed on the carrier; (k) a set of flanges formed on the carrier; (l) a set of projections attached to the carrier; (m) a set of projections attached in a set of apertures on the carrier; (n) a set of projections integrally formed on the carrier; (o) a set of projections formed by machining of the carrier; (p) a set of projections comprising a set of features formed by machining of the carrier.

The door may comprise a door assembly. The door assembly may comprise at least one of (a) a cover and a substrate; (b) a cover and a base; (c) a cover structure and a carrier structure; (d) a cover and a carrier structure; (e) a base structure comprising a cover and a substrate comprising the set of projections; (f) a cover and a base structure formed by co-extrusion; (g) a cover and a carrier structure formed by co-extrusion; (h) a cover and a carrier formed by co-extrusion; (i) a cover coupled to a carrier formed by extrusion.

The present invention relates to a vehicle trim component. The component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may comprise a top layer and a bottom layer; the bottom layer may comprise openings; the set of pins may be coupled to the bottom layer at the openings. The bottom layer of the cover may comprise substantially parallel ribs configured to move relative to one another to facilitate bending of the cover. The substantially parallel ribs may comprise the openings. The bottom layer of the cover may comprise notches configured to facilitate bending of the cover. The bottom layer may comprise substantially parallel ribs configured to move relative to one another to facilitate bending of the cover; the notches may be between the ribs. Each pin of the set of pins may comprise a first portion configured to couple the set of pins to the openings and a second portion configured to engage the base. The second portion of each pin of the set of pins may be substantially spherical. The base may comprise a first wall and a second wall opposing the first wall; the set of pins may comprise a first subset of pins and second subset of pins; the first subset of pins may be configured to engage the first wall of the base and the second subset of pins may be configured to engage the second wall of the base. The top layer and the bottom layer may be prepared by an extrusion process and the top layer may be bonded to the bottom layer. The top layer may be comprised of a first material and the bottom layer may be comprised of a second material different than the first material; the top layer and the bottom layer may be prepared by an extrusion process and the top layer may be bonded to the bottom layer. The top layer may be bonded to the bottom layer as the top layer and the bottom layer are extruded.

The present invention also relates to a vehicle trim component. The component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may comprise a top layer and a bottom layer; the bottom layer of the cover may comprise the set of pins. The bottom layer may comprise substantially parallel ribs configured to move relative to one another to facilitate bending of the cover. The substantially parallel ribs may comprise protrusions; the set of pins may be bonded to the protrusions. Each pin of the set of pins may comprise a first portion configured to couple the set of pins to the protrusions and a second portion configured to engage the base. The second portion of each pin of the set of pins may be substantially spherical. The base may comprise a first wall and a second wall opposing the first wall; the set of pins may comprise a first subset of pins and second subset of pins; the first subset of pins may be configured to engage the first wall of the base and the second subset of pins may be configured to engage the second wall of the base. The top layer and the bottom layer may be prepared by an extrusion process and the top layer may be bonded to the bottom layer; the top layer may be comprised of a first material and the bottom layer may be comprised of a second material different than the first material. The top layer and the bottom layer may be prepared by an extrusion process and the top layer may be bonded to the bottom layer; the top layer may be bonded to the bottom layer as the top layer and the bottom layer are extruded.

The present invention also relates to a vehicle trim component. The component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may comprise a top layer and a bottom layer; the base may comprise a first wall and a second wall opposing the first wall; the set of pins may comprise a first subset of pins and second subset of pins; the first subset of pins may be configured to engage the first wall of the base and the second subset of pins may be configured to engage the second wall of the base. The bottom layer of the cover may comprise substantially parallel ribs configured to move relative to one another to facilitate bending of the cover; the set of pins may be coupled to the substantially parallel ribs. Each pin of the set of pins may comprise a first portion configured to couple each pin to the bottom layer of the cover and a second portion configured to engage the base. The second portion of each pin may be substantially spherical. The top layer and the bottom layer may be prepared by an extrusion process and the top layer may be bonded to the bottom layer. The top layer may be comprised of a first material and the bottom layer may be comprised of a second material different than the first material. The top layer and the bottom layer may be prepared by an extrusion process and the top layer may be bonded to the bottom layer. The top layer may be bonded to the bottom layer as the top layer and the bottom layer are extruded.

The present invention also relates to a vehicle trim component. The component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may comprise a top layer and a bottom layer; the bottom layer may comprise a set of protrusions; the set of pins may be coupled to the bottom layer at the protrusions. The bottom layer of the cover may comprise substantially parallel ribs configured to move relative to one another to facilitate bending of the cover. The ribs may comprise the protrusions. Each pin of the set of pins may comprise a first portion configured to couple the set of pins to the set of protrusions and a second portion configured to engage the base. The second portion of each pin of the set of pins may be substantially spherical. The base may comprise a first wall and a second wall opposing the first wall; the set of pins may comprise a first subset of pins and second subset of pins; the first subset of pins may be configured to engage the first wall of the base and the second subset of pins may be configured to engage the second wall of the base. The top layer and the bottom layer may be prepared by an extrusion process and the top layer may be bonded to the bottom layer. The top layer may be comprised of a first material and the bottom layer may be comprised of a second material different than the first material. The top layer and the bottom layer may be prepared by an extrusion process and the top layer may be bonded to the bottom layer; the top layer may be bonded to the bottom layer as the top layer and the bottom layer are extruded.

The present invention also relates to a trim component for a vehicle interior. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a top layer and a bottom layer bonded to the top layer; the top layer and the bottom layer may be prepared by an extrusion process. The top layer may be comprised of a first material and the bottom layer may be comprised of a second material different than the first material. The top layer may be bonded to the bottom layer as the top layer and the bottom layer are extruded.

The present invention also relates to a vehicle trim component. The trim component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may comprise a top layer, a first bottom layer and a second bottom layer; the first bottom layer may be bonded to the top layer and the second bottom layer may be bonded to the top layer. The set of pins may comprise a first subset of pins and a second subset of pins; the first bottom layer may comprise the first subset of pins and the second bottom layer may comprise the second subset of pins. The top layer may be comprised of a first material; the first bottom layer and the second bottom layer may be comprised of a second material different than the first material. The top layer, the first bottom layer and the second bottom layer may be prepared by an extrusion process; the top layer may be bonded to the first bottom layer and the second bottom layer as the top layer; the first bottom layer and the second bottom layer are extruded.

The present invention also relates to a trim component for a vehicle interior. The component may comprise a base and a cover (e.g. provided by or as a door, door assembly, etc.) comprising a set of pins configured to engage the base and facilitate movement of the cover relative to the base between a closed position and an open position. The cover (e.g. cover, cover structure/assembly, door, door structure/assembly, etc.) may be prepared by a process comprising extruding a first material to form a bottom layer of the cover and extruding a second material to form a top layer of the cover. The process may also comprise removing a portion of at least one of the bottom layer of the cover or the top layer of the cover to form the pins. At least one of the first material or the second material may be extruded in a direction substantially parallel to a path of movement of the cover. The top layer of the cover may comprise a top surface configured to face the interior of the vehicle; the top surface of the top layer of the cover may be non-planar.

The present invention also relates to a method of making a cover (e.g. provided by or as a door, door assembly, etc.) for a vehicle trim component. The method may comprise extruding a first polymer material through a first extrusion die in a direction substantially perpendicular to a direction of travel of the cover to form a top layer of a cover precursor; extruding a second polymer material through a second extrusion die in a direction substantially perpendicular to a direction of travel of the cover to form a bottom layer of the cover precursor; bonding the top layer to the bottom layer; and cutting away portions of the cover precursor to form protrusions. The protrusions may comprise pins configured to engage a base of the vehicle trim component and facilitate movement of the cover relative to the base between a closed position and an open position. The method may also comprise coupling a mold to the cover precursor over the protrusions and molding pins over each of the protrusions; the pins may be configured to engage a base of the vehicle trim component and facilitate movement of the cover relative to the base between a closed position and an open position. Extruding the first polymer material through the first extrusion die may occur simultaneously with extruding the second polymer through the second extrusion die; the top layer may be bonded to the bottom layer simultaneously with extruding the first and second polymer materials.

The present invention also relates to a method of making a cover (e.g. provided by or as a door, door assembly, etc.) for a vehicle trim component. The method may comprise extruding a first polymer material through a first extrusion die in a direction substantially perpendicular to a direction of travel of the cover to form a top layer of a substrate; extruding a second polymer material through a second extrusion die in a direction substantially perpendicular to a direction of travel of the cover to form a bottom layer of a substrate; and bonding the top layer to the bottom layer. The method may also comprise bonding preformed pins into channels of the substrate. The pins may extend entirely through the channels; the pins may extend partially through the channels. Extruding the first polymer material through the first extrusion die may occur simultaneously with extruding the second polymer material through the second extrusion die; the top layer may be bonded to the bottom layer simultaneously with extruding the first and second polymer materials. Extruding the second polymer material through the second extrusion die may be started before extruding the first polymer material through the first extrusion die and stopped after extruding the first polymer material through the first extrusion die has stopped.

The present invention further relates to a method of making a cover (e.g. provided by or as a door, door assembly, etc.) for a vehicle trim component. The method may comprise extruding a first polymer material through a first extrusion die in a direction substantially parallel to a direction of travel of the cover to form a top layer of a substrate; extruding a second polymer material through a second extrusion die in a direction substantially parallel to the direction of travel of the cover to form a top layer of a substrate; bonding the top layer to the bottom layer; and cutting away portions of the substrate to form pins configured to engage a base of the vehicle trim component and facilitate movement of the cover relative to the base between a closed position and an open position. Extruding the first polymer material through the first extrusion die may occur simultaneously with extruding the second polymer through the second extrusion die; the top layer may be bonded to the bottom layer simultaneously with extruding the first and second polymer materials.

The present invention relates to a vehicle trim component. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a substrate comprising openings. The pins may be coupled to the substrate at the openings. The substrate may comprise substantially parallel ribs configured to move relative to one another to facilitate bending of the cover; the ribs may comprise the openings. The cover may comprise a visible surface; the substrate may comprise apertures between the visible surface and the openings. The substrate may comprise notches configured to facilitate bending of the cover; the substrate may comprise substantially parallel ribs configured to move relative to one another to facilitate bending of the cover. The notches may be between the ribs. Each of the pins may comprise a first portion configured to couple each of the pins to the openings and a second portion configured to engage the base. The second portion of each of the pins may be substantially spherical. The base may comprise a first wall and a second wall opposing the first wall; the pins may comprise a first set of pins and second set of pins; the first set of pins may be configured to engage the first wall of the base and the second set of pins may be configured to engage the second wall of the base. The substrate may comprise a core comprising a first thickness and an extension comprising a second thickness less than the first thickness. The base may comprise a first wall and a second wall opposing the first wall; the extension may comprise a portion of the pins; the extension may be configured to engage the base and the core may be configured to extend between the first wall and the second wall.

The present invention also relates to a vehicle trim component. The component may comprises a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a substrate. The pins may be bonded to the substrate. The substrate may comprise substantially parallel ribs configured to move relative to one another to facilitate bending of the cover. The ribs may comprise protrusions; the pins may be bonded to the protrusions. Each of the pins may comprise a first portion configured to couple each of the pins to the protrusions and a second portion configured to engage the base. The second portion of each of the pins may be substantially spherical. The substrate may comprise notches configured to facilitate bending of the cover. The substrate may comprise substantially parallel ribs configured to move relative to one another to facilitate bending of the cover. The notches may be between the ribs. The base may comprise a first wall and a second wall opposing the first wall; the pins may comprise a first set of pins and second set of pins; the first set of pins may be configured to engage the first wall of the base and the second set of pins may be configured to engage the second wall of the base. The substrate may comprise a core comprising a first thickness and an extension comprising a second thickness less than the first thickness. The base may comprise a first wall and a second wall opposing the first wall; the pins may be bonded to the extension; the core may be configured to extend between the first wall and the second wall. The substrate may be prepared by an extrusion process and the pins may be bonded to the substrate as the pins are molded.

The present invention also relates to a vehicle trim component. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a substrate; the base may comprise a first wall and a second wall opposing the first wall; the pins may comprise a first set of pins and second set of pins; the first set of pins may be configured to engage the first wall of the base and the second set of pins may be configured to engage the second wall of the base. The substrate may comprise substantially parallel ribs configured to move relative to one another to facilitate bending of the cover; the pins may be coupled to the ribs. The substrate may comprise notches configured to facilitate bending of the cover. The substrate may comprise substantially parallel ribs configured to move relative to one another to facilitate bending of the cover. The notches may be between the ribs. Each of the pins of the first set of pins and the second set of pins may comprise a first portion configured to couple each of the pins to the substrate and a second portion configured to engage the base. The second portion of the pins may be substantially spherical. The substrate may comprise a core comprising a first thickness and an extension comprising a second thickness less than the first thickness; the extension may comprise a portion of the first set of pins and the second set of pins; the extension may be configured to engage the base and the core may be configured to extend between the first wall and the second wall.

The present invention also relates to a vehicle trim component. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a substrate comprising protrusions; the pins may be coupled to the substrate at the protrusions. The substrate may comprise substantially parallel ribs configured to move relative to one another to facilitate bending of the cover. The ribs may comprise the protrusions. The substrate may comprise notches configured to facilitate bending of the cover. The substrate may comprise substantially parallel ribs configured to move relative to one another to facilitate bending of the cover; the notches may be between the ribs. Each of the pins may comprise a first portion configured to couple each of the pins to the protrusions and a second portion configured to engage the base. The second portion of the pins may be substantially spherical. The base may comprise a first wall and a second wall opposing the first wall; the pins may comprise a first set of pins and second set of pins; the first set of pins may be configured to engage the first wall of the base and the second set of pins may be configured to engage the second wall of the base. The substrate may comprise a core comprising a first thickness and an extension comprising a second thickness less than the first thickness. The base may comprise a first wall and a second wall opposing the first wall; the extension may comprise a portion of the pins; the extension may be configured to engage the base and the core may be configured to extend between the first wall and the second wall.

The present invention also relates to a trim component for a vehicle interior. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may comprise a substrate comprising a first portion hinged to a second portion; the second portion may comprise a top surface and the first portion may comprise a bottom surface. The bottom surface of the first portion of the substrate may be adjacent the top surface of the second portion of the substrate. The top surface of the second portion of the substrate may be bonded to the bottom surface of the first portion of the substrate. The first portion of the substrate may comprise a top surface configured to face the interior of the vehicle. The substrate may be prepared by an extrusion process and the second portion of the substrate may be folded onto the first portion of the substrate after the extrusion process to form the cover (e.g. cover, cover structure/assembly, door, door structure/assembly, etc.).

The present invention also relates to a vehicle trim component. The component may comprise a base and a cover (e.g. provided by or as a door, door assembly, etc.) comprising pins configured to engage the base and facilitate movement of the cover relative to the base between a closed position and an open position. The cover (e.g. cover, cover structure/assembly, door, door structure/assembly, etc.) may be prepared by a process comprising extruding a material to form an extruded substrate and removing a portion of the extruded substrate to form the pins.

The present invention also relates to a vehicle trim component. The component may comprise a base and a cover (e.g. provided by or as a door, door assembly, etc.) comprising pins configured to engage the base and facilitate movement of the cover relative to the base along a path between a closed position and an open position. The cover (e.g. cover, cover structure/assembly, door, door structure/assembly, etc.) may comprise a substrate prepared by an extrusion process; the substrate may be extruded in a direction substantially parallel to the path of movement of the cover. The pins may be configured to move relative to one another to facilitate bending of the cover.

The present invention also relates to a method of making a cover (e.g. provided by or as a door, door assembly, etc.) for a vehicle trim component. The method may comprise extruding a polymer material through an extrusion die in a direction substantially perpendicular to a direction of travel of the cover to form a cover precursor and cutting away portions of the cover precursor to form protrusions. The protrusions may comprise pins configured to engage a base of the vehicle trim component and facilitate movement of the cover relative to the base between a closed position and an open position. The method may also comprise coupling a mold to the cover precursor over the protrusions and molding pins over each of the protrusions; the pins may be configured to engage a base of the vehicle trim component and facilitate movement of the cover relative to the base between a closed position and an open position.

The present invention also relates to a method of making a cover (e.g. provided by or as a door, door assembly, etc.) for a vehicle trim component. The method may comprise extruding a polymer material through an extrusion die in a direction substantially perpendicular to a direction of travel of the cover to form a substrate and bonding preformed pins into channels of the substrate. The pins may extend entirely through the channels; the pins may extend partially through the channels. The substrate may comprise a first portion comprising a top surface hinged to a second portion comprising a bottom surface. The method may also comprise bonding the first portion of the substrate to the bottom surface of the second portion of the substrate.

The present invention further relates to a method of making a cover (e.g. provided by or as a door, door assembly, etc.) for a vehicle trim component. The method may comprise extruding a polymer material through an extrusion die in a direction substantially parallel to a direction of travel of the cover to form a substrate; and cutting away portions of the substrate to form pins configured to engage a base of the vehicle trim component and facilitate movement of the cover relative to the base between a closed position and an open position.

FIGURES

FIG. 5A is a schematic perspective view of a cover for a component of a vehicle interior according to an exemplary embodiment.

FIG. 5B is a schematic perspective exploded view of a cover for a component of a vehicle interior according to an exemplary embodiment.

FIG. 5C is a schematic side view of a cover for a component of a vehicle interior according to an exemplary embodiment.

FIG. 5D is a schematic view of first and second extrusion dies for forming a cover for a component of a vehicle interior according to an exemplary embodiment.

FIG. 5E is a schematic partial perspective view of a cover precursor for a component of a vehicle interior according to an exemplary embodiment.

FIG. 5F is a schematic partial section view of a cover for a component of a vehicle interior engaged with a base of the component according to an exemplary embodiment.

FIG. 10A is a schematic perspective view of a cover for a component of a vehicle interior according to an exemplary embodiment.

FIG. 10B is a schematic perspective view of a cover for a component of a vehicle interior according to an exemplary embodiment.

FIG. 10C is a schematic front view of a cover for a component of a vehicle interior according to an exemplary embodiment.

FIG. 10D is a schematic view of first and second extrusion dies for forming a cover for a component of a vehicle interior according to an exemplary embodiment.

FIG. 10E is a schematic partial side view of a cover precursor for a component of a vehicle interior according to an exemplary embodiment.

FIG. 10F is a schematic partial section view of a cover for a component of a vehicle interior engaged with a base of the component according to an exemplary embodiment.

FIG. 18A is a schematic perspective view of a cover for a component of a vehicle interior according to an exemplary embodiment.

FIG. 18B is a schematic front view of a cover for a component of a vehicle interior according to an exemplary embodiment.

FIG. 18C is a schematic view of an extrusion die for forming a cover for a component of a vehicle interior according to an exemplary embodiment.

FIG. 18D is a schematic partial side view of a cover precursor for a component of a vehicle interior according to an exemplary embodiment.

FIG. 18E is a schematic partial perspective view of a cover for a component of a vehicle interior according to an exemplary embodiment.

FIG. 18F is a schematic partial section view of a cover for a component of a vehicle interior engaged with a base of the component according to an exemplary embodiment.

DESCRIPTION

Figure 1A:
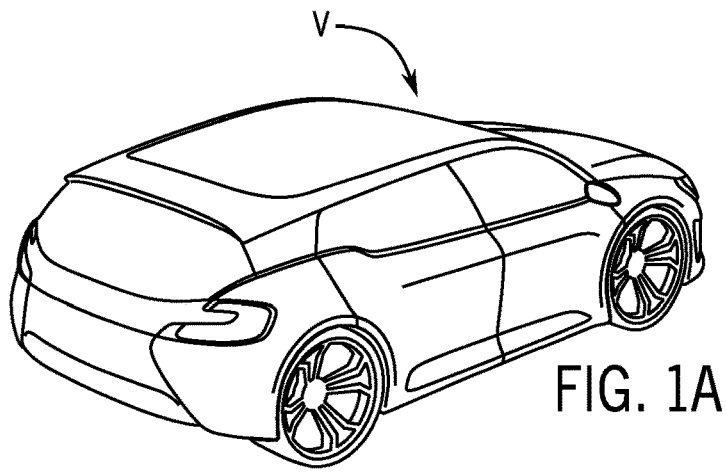
FIG. 1A is a schematic perspective view of a vehicle according to an exemplary embodiment.
Figure 1B:
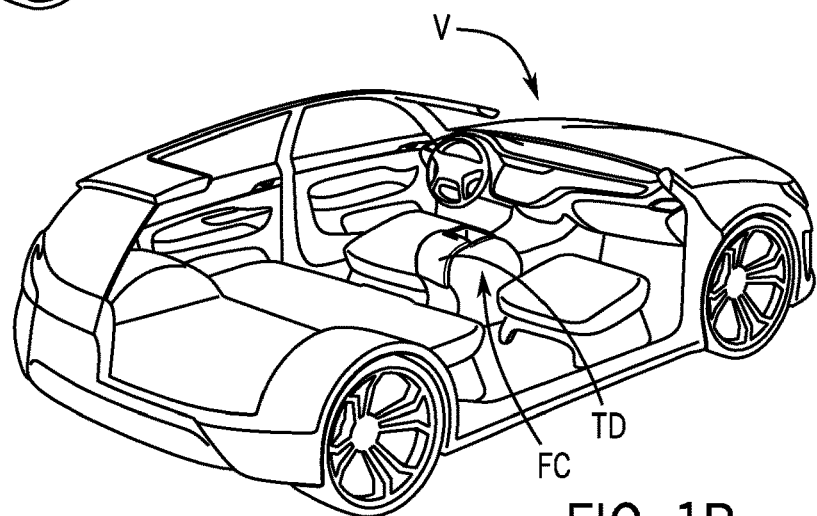
FIG. 1B is a schematic perspective cut-away view of a vehicle showing the interior of the vehicle according to an exemplary embodiment.
Figure 1C:
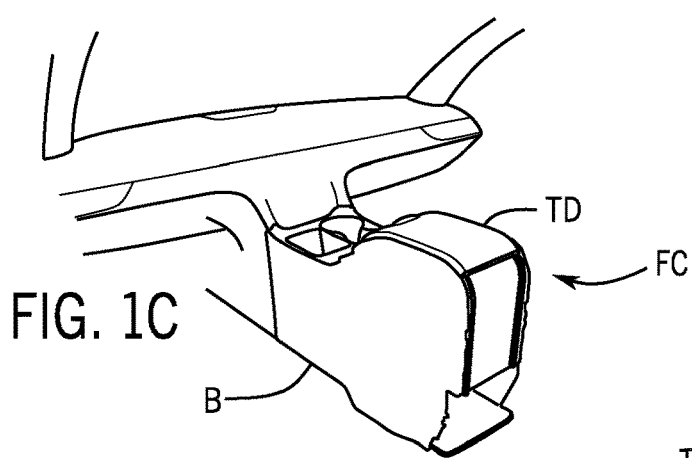
FIG. 1C is a schematic perspective view of a component of a vehicle interior according to an exemplary embodiment.

Referring to FIGS. 1A and 1B, a vehicle V is shown schematically according to an exemplary embodiment providing a vehicle interior component shown as a console in the form of a floor console FC. As shown schematically according to an exemplary embodiment in FIGS. 1B and 1C, console FC comprises a base or base structure B providing a compartment with an opening; console FC comprises a movable door shown as a tambour door TD for the compartment (see FIG. 1D).

Figure 2A:
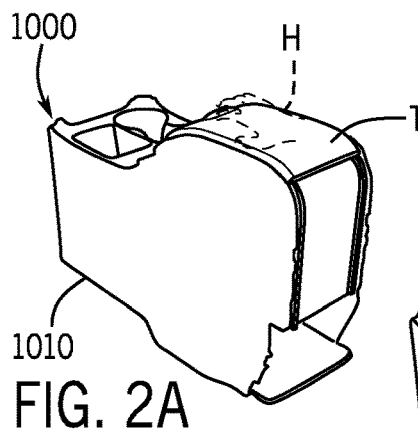
FIGS. 2A to 2C are schematic perspective views of a component of a vehicle interior with a cover moved between a closed position and an open position according to an exemplary embodiment.
Figure 2B:
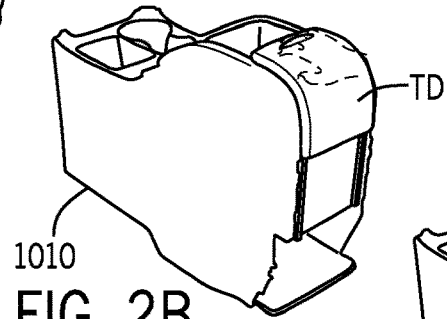
Figure 2C:
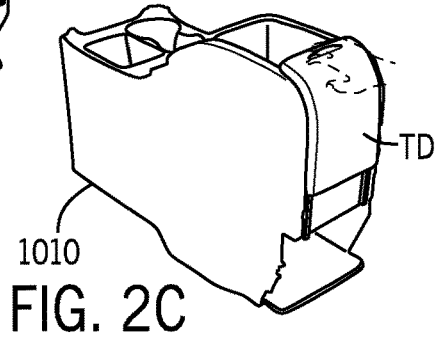

As shown schematically in FIGS. 1B-1C and 2A-2C, door TD can be moved relative to the opening of compartment (e.g. moved/translated in a guide or track system in base structure B) from a closed position blocking/limiting access to the compartment (see FIGS. 1C and 2A) to an open position permitting access to the compartment (see FIGS. 1B and 2B-2C). As indicated schematically in FIGS. 2A-2C, door assembly TD may comprise a generally flexible structure (e.g. semi-rigid, bendable, segmented, etc.) configured to bend freely according to the form or shape of the guide or track; as shown schematically according to an exemplary embodiment in FIGS. 2A-2C, the guide or track system for door or door assembly TD may be provided in a curved form and door TD may be configured to flex/bend as guided by an external force such as the hand H of an occupant of the vehicle directing movement of door TD in and along the guide of the track system (e.g. a generally continuous set of tracks to engage an interface of door TD).

Figure 1D:
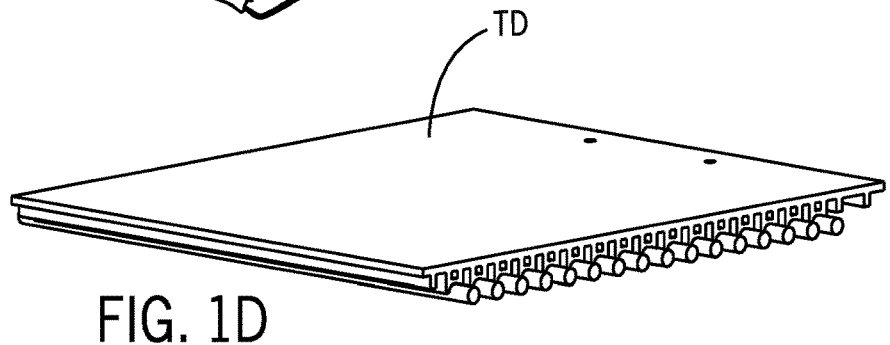
FIG. 1D is a schematic perspective view of a cover for a component of a vehicle interior according to an exemplary embodiment.
Figure 2D:
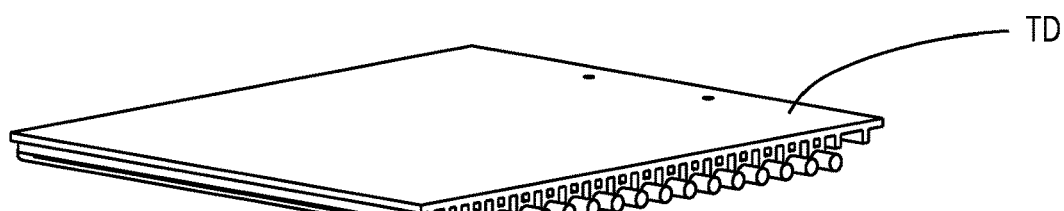
FIG. 2D is a schematic perspective view of a cover for a component of a vehicle interior according to an exemplary embodiment.
Figure 2F:
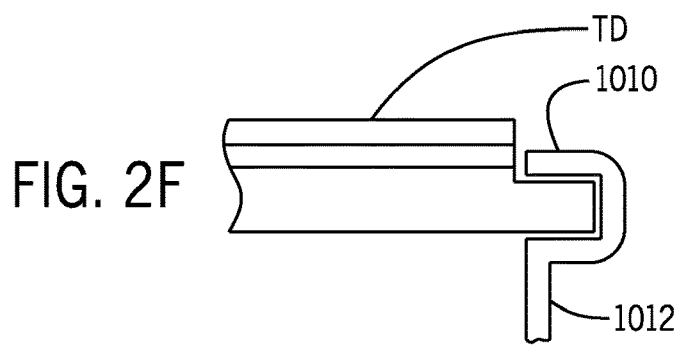
FIG. 2F is a schematic partial section view of a cover for a component of a vehicle interior engaged with a base of the component according to an exemplary embodiment.

As shown schematically in FIGS. 1D and 2D, door TD may comprise a door assembly comprising a cover or cover layer (e.g. providing an exterior appearance and/or surface) and a carrier or substrate section (e.g. providing a structure and/or interface with the base of the console); as shown schematically, the carrier or substrate section of door assembly TD may provide a set of projections (along each side of the door/carrier) configured to engage a set of guides shown tracks (along each side of the opening of the compartment) of the base of the console 1000 to allow door TD to be moved between the open position and the closed position. See also FIGS. 2A-2C and 2E-2F. As shown schematically according to an exemplary embodiment in FIG. 2D, the carrier or substrate section of door assembly TD may comprise a set of transverse segments shown as ribs (e.g. to provide door TD with a generally flexible structure as indicated in FIGS. 2A-2C); the set of projections for door TD may be provided by a set of members shown as posts that are coupled/attached to the segments of the carrier or substrate section (and extend laterally beyond the cover/cover layer) to engage the guide or track of the base structure of the console.

Figure 2E:
FIG. 2E is a schematic section view of a cover for a component of a vehicle interior engaged with a base of the component according to an exemplary embodiment.
Figure 3A:
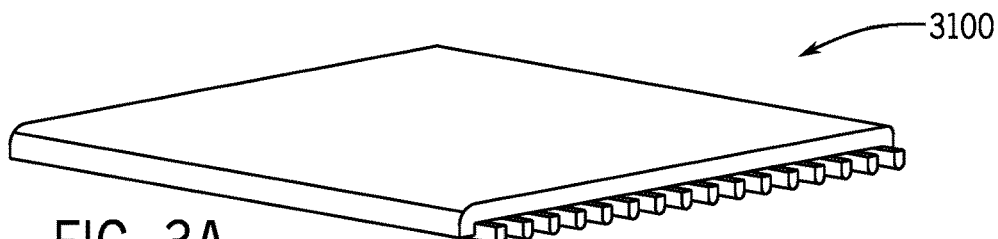
FIG. 3A is a schematic perspective view of a cover for a component of a vehicle interior according to an exemplary embodiment.
Figure 3B:
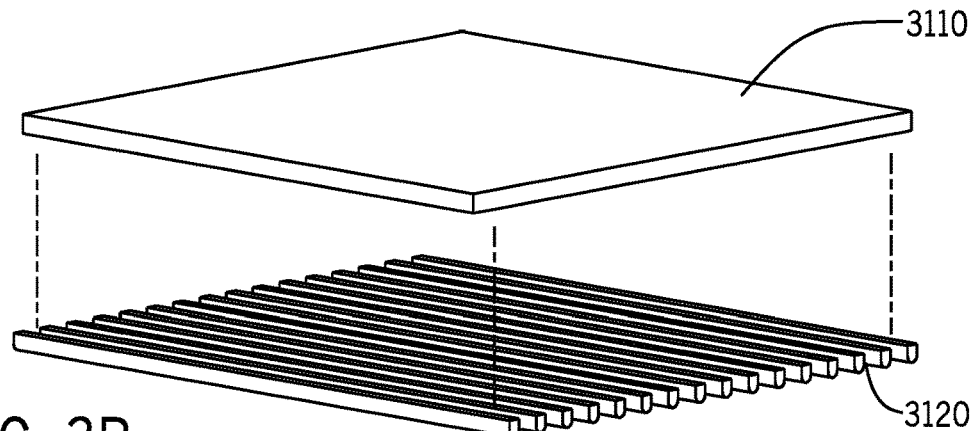
FIG. 3B is a schematic perspective exploded view of a cover for a component of a vehicle interior according to an exemplary embodiment.
Figure 3C:
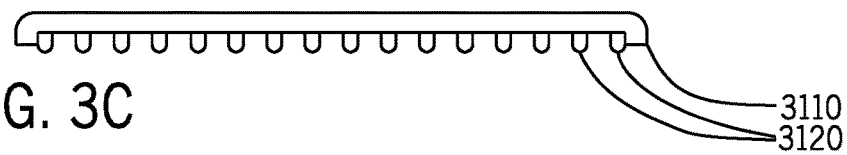
FIG. 3C is a schematic side view of a cover for a component of a vehicle interior according to an exemplary embodiment.
Figure 3D:
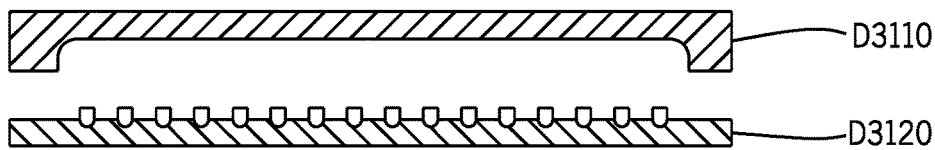
FIG. 3D is a schematic view of first and second extrusion dies for forming a cover for a component of a vehicle interior according to an exemplary embodiment.
Figure 3E:
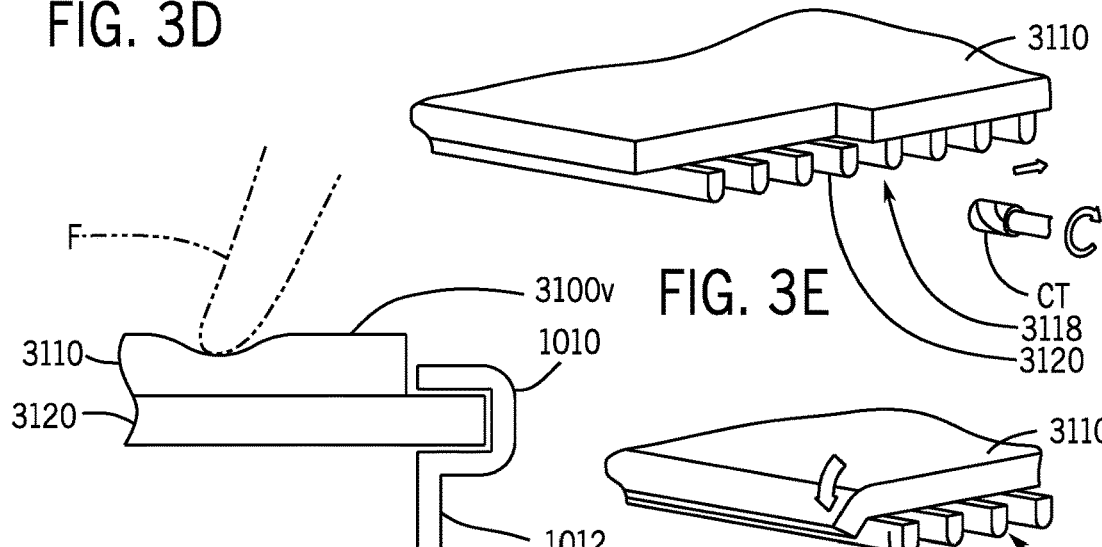
FIG. 3E is a schematic partial perspective view of a cover precursor for a component of a vehicle interior according to an exemplary embodiment.
Figure 3F:
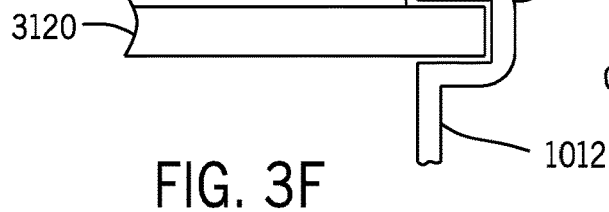
FIG. 3F is a schematic partial section view of a cover for a component of a vehicle interior engaged with a base of the component according to an exemplary embodiment.
Figure 3G:
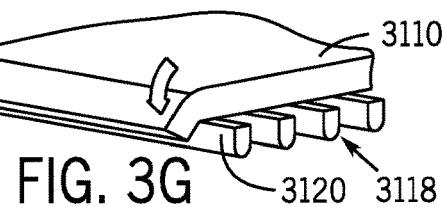
FIG. 3G is a schematic partial perspective view of a cover for a component of a vehicle interior according to an exemplary embodiment.
Figure 4A:
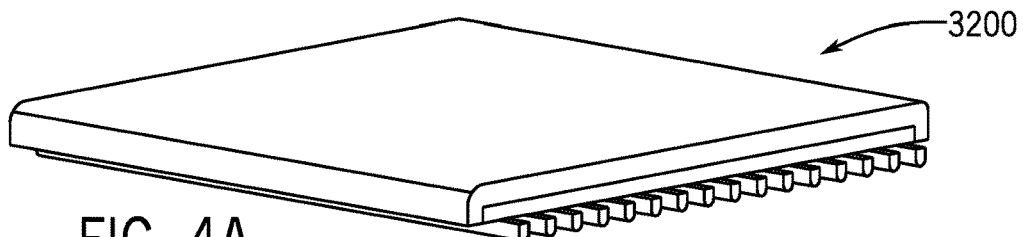
FIG. 4A is a schematic perspective view of a cover for a component of a vehicle interior according to an exemplary embodiment.
Figure 4B:
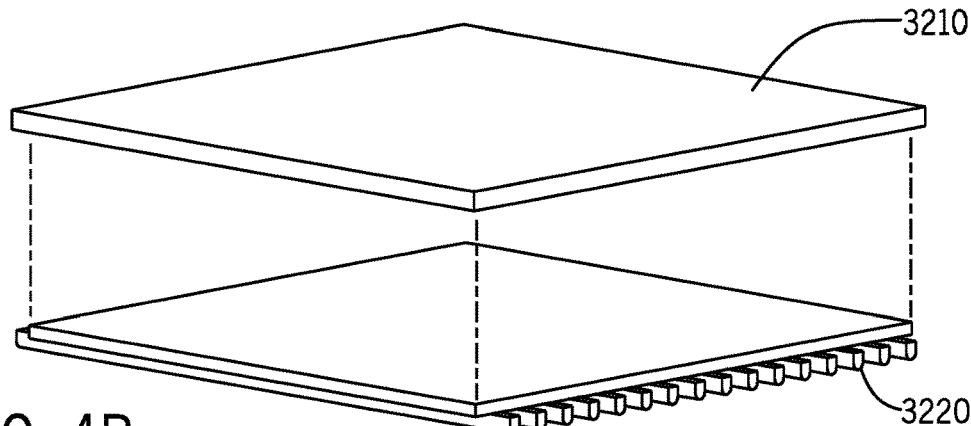
FIG. 4B is a schematic perspective exploded view of a cover for a component of a vehicle interior according to an exemplary embodiment.
Figure 4C:
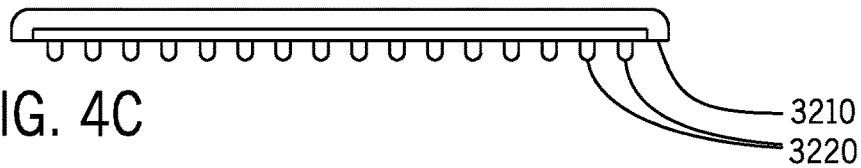
FIG. 4C is a schematic side view of a cover for a component of a vehicle interior according to an exemplary embodiment.
Figure 4D:
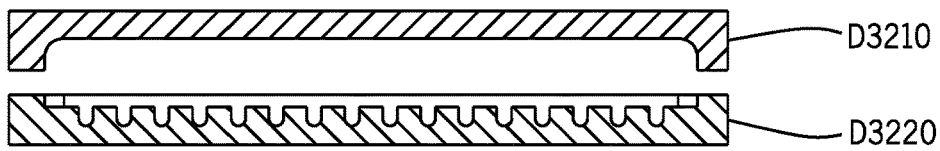
FIG. 4D is a schematic view of first and second extrusion dies for forming a cover for a component of a vehicle interior according to an exemplary embodiment.
Figure 4E:
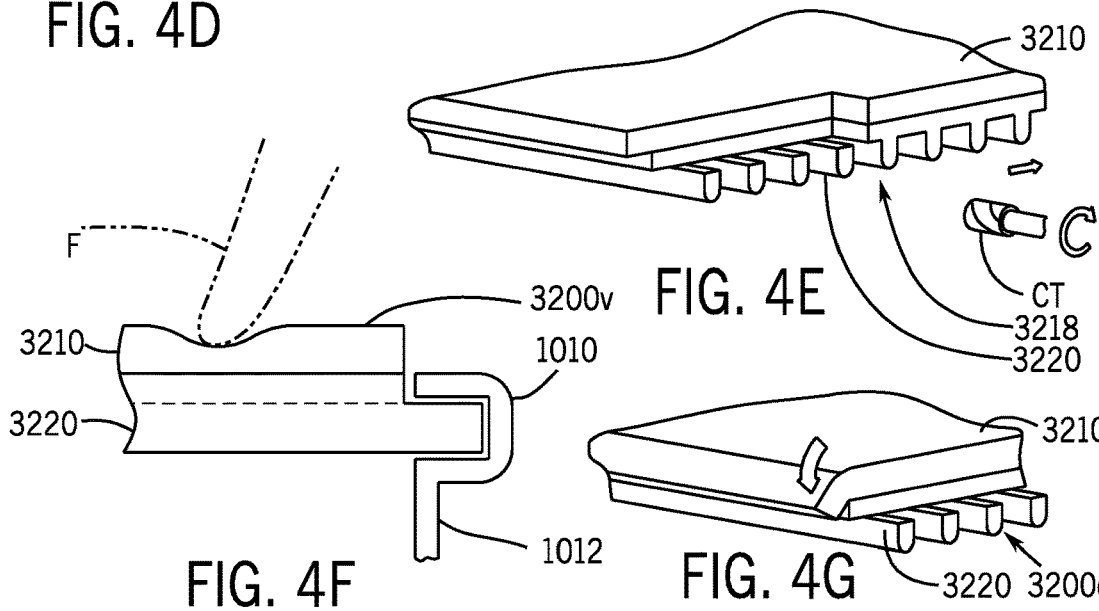
FIG. 4E is a schematic partial perspective view of a cover precursor for a component of a vehicle interior according to an exemplary embodiment.
Figure 4F:
FIG. 4F is a schematic partial section view of a cover for a component of a vehicle interior engaged with a base of the component according to an exemplary embodiment.
Figure 4G:
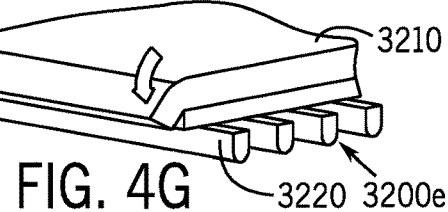
FIG. 4G is a schematic partial perspective view of a cover for a component of a vehicle interior according to an exemplary embodiment.

As shown schematically in FIGS. 2D and 2E, the interface of door assembly TD at the opening of the compartment of the base structure 1010 of the console may have a generally symmetrical form (e.g. with each set of the projections on each side of the door configured to engage a guide or track on each side of the opening of the compartment). See also for example FIGS. 9B, 10B, 13B, 15A-15B, 16A-16B, 17A-17B, and 18A-18B.

Referring to FIGS. 3A-3F, according to an exemplary embodiment, a door assembly 3100 may comprise a cover 3110 and a carrier structure 3120 providing the set of projections (e.g. formed by machining with a cutting tool CT) for engagement of the guide/track of a base 3010/3012 of the console; cover 3110 and carrier structure 3120 may be formed into door assembly 3100 in a tool shown as mold D3110/D3120. As indicated schematically, cover 3110 may comprise a compliant material/layer such as a foam (see FIG. 3F); door assembly 3100 may be constructed by folding edges (e.g. leading and trailing) of cover 3110 on carrier structure 3120. As shown schematically, the projections of carrier structure 3120 of door assembly 3100 may comprise a feature such as set of posts that is exposed when a portion of the cover section is machined (e.g. by a tool such as a cutting tool CT). See FIGS. 3E, 4E, 5E, 7E, 9E, 10E, 11E, 12E and 18D.

According to an exemplary embodiment, the door may be prepared by a process comprising the step of forming (e.g. molding, extruding, etc.) a material into the substrate/carrier to form an extruded structure for (or with) the cover/cover layer. See for example FIGS. 3D, 14D, 15D and 18C. The process may comprise the step of removing a portion of the extruded substrate to form the set of projections. See for example FIGS. 3E, 4E, 5E, 7E, 9E, 10E, 11E, 12E and 18D.

As shown schematically in the FIGURES according to an exemplary embodiment, the door or door assembly may be provided in any of a wide variety of forms/structures (such as multi-layered, multi-sectioned, etc.) by any of a wide variety of forming techniques (including but not limited to extrusion/co-extrusion, injection molding, machining/cutting, component assembly, adhesive bonding, forming, etc.) and from a wide variety of materials (including plastics, extruded plastics/resins, molded resins, injection molded resins, composite materials, fiber-based materials, etc.).

As shown schematically according to an exemplary embodiment for the door assembly, the carrier may comprise a base or base structure (see FIGS. 4A-4G); the base or base structure may comprise the cover and provide a structure such as a set of grooves/channels or ribs for attachment of a carrier providing a set of projections (e.g. formed and/or machined) (see FIGS. 5A-5F); the base or base structure may comprise a carrier configured with apertures for attachment of a set of projections shown as posts or pegs (e.g. by interference fit, insertion, adhesive, etc.) (see FIGS. 6A-6F); the base or base structure may comprise a carrier comprising a multi-layer structure formed to provide a set of ribs attached to the cover layer and machined to provide a set of projections shown as a rim (e.g. by a cutting tool CT) (see FIGS. 7A-7F); the cover and the carrier may be integrally formed and attached (e.g. formed, injection molded, folded, etc.) to provide a multi-layer construction (see FIGS. 14A-14G); the cover may be integrally formed with the carrier configured with apertures for attachment of a set of projections shown as posts or pegs (e.g. by interference fit, insertion, adhesive, forming, molding/co-molding, etc.) (see FIGS. 15A-15G, 16A-16G and 17A-17H); the door assembly may comprise an integrated cover/carrier comprising the set of projections (e.g. formed, extruded, integrally formed, formed and machined, etc.) (see FIGS. 18A-18F).

As shown schematically according to an exemplary embodiment for the door assembly, the carrier may comprise a base or base structure providing a carrier configured with a set of projections shown as posts or pegs providing a feature such as a head configured to fit in the guide or track of the base of the console (e.g. knob, cap, machined end, etc.) (see FIGS. 8A-8F); the carrier may comprise a base or base structure configured with a set of projections shown as posts or pegs providing a feature such as a head configured to fit in the guide or track of the base of the console (e.g. knob, cap, machined end, etc.) and attached to a feature such as a projection on the carrier (see FIGS. 9A-9G and 16A-16G); the carrier may comprise a set of flanges formed with a set of projections and attached to the sides of the cover (e.g. formed, extruded, co-extruded, formed and machined, extruded and machined, co-extruded and machined, etc.) (see FIGS. 10A-10F); the base or base structure may comprise a carrier structure formed to provide a set of projections comprising a set of guides configured to engage the guide or track of the base of the console (e.g. a set of rims, tracks, channels, flanges, etc.) (see FIGS. 11A-11F); the carrier may comprise a set of separate segments such members (e.g. rods, posts, etc.) or attached/inserted into apertures (e.g. as pins, posts, pegs) providing the set of projections (e.g. formed, machined, etc.) (see FIGS. 12A-12F and 13A-13F).

As shown schematically according to an exemplary embodiment in the FIGURES, the vehicle interior component may comprise a base providing a compartment with an opening and a door configured for movement relative to the base to an open position to facilitate access through the opening into the compartment of the base. See FIGS. 2A-2C. According to an exemplary embodiment shown schematically in FIGS. 2F, 3F and 4F, an interface may be provided between the base and the door configured to facilitate movement of the door relative to the base. See also FIGS. 5F, 6F, 7F, 8F, 9H, 10F, 11F, 12F, 13F, 14G, 15G, 16G, 17H and 18F. As indicated schematically, the interface may comprise a set of projections on the door configured to engage a set of guides on the base. See generally FIGS. 2F, 3F, 4F, 5F, 6F, 7F, 8F, 9H, 10F, 11F, 12F, 13F, 14G, 15G, 16G, 17H and 18F (example arrangements of components the interface).

According to an exemplary embodiment shown schematically in the FIGURES, the set of projections may be formed or extruded (e.g. molded, extrusion-formed, etc.). According to an exemplary embodiment, the set of projections may be formed by extruding a polymer material in a direction substantially perpendicular to a path of movement of the door relative to the base. See e.g. FIGS. 10A-10D. The set of projections may be formed by extruding a polymer material in a direction substantially parallel to a path of movement of the door relative to the base. See e.g. FIGS. 18A-18D.

According to an exemplary embodiment, the door (e.g. carrier, cover, structure, etc.) may be formed by molding and/or extrusion; the set of projections on the door (e.g. carrier, base structure, etc.) may be formed by machining (e.g. a milling/cutting operation. See generally FIGS. 3E, 4E, 5E, 7E, 9E, 10E, 11E, 12E and 18D. According to an exemplary embodiment, the carrier of the door/door assembly may comprise a set of openings shown as apertures; the set of projections (e.g. pins, posts, pegs, members, knobs, caps, extensions, rims, flanges, channels, etc.) may be coupled to the door at the set of openings. See for example FIGS. 6E-6F, 8E-8F, 9F-9H, 13E-13F, 14F-14G, 15E-15G, 16E-16G and 17F-17H. The door may comprise a set of channels (e.g. grooves, slots, etc.); the set of projections may extend into and/or through the set of channels. See generally FIGS. 2A-2D. The door may comprise at least one of a set of apertures or a set of grooves; and the set of projections may be inserted into the at least one of the set of apertures or the set of grooves. See generally FIGS. 6A-6F, 8A-8F, 9A-9H, 13A-13F, 14A-14G, 15A-15G, 16A-16G and 17A-17H.

According to an exemplary embodiment, the door may comprise a substrate and a cover layer; the substrate may comprise an extrusion; the cover layer may comprise an extrusion. According to an exemplary embodiment, the substrate and the cover layer may be formed by co-extrusion. See generally FIGS. 10A-10F. According to an exemplary embodiment, the cover layer may be bonded to the substrate as the substrate is extruded. See for example FIGS. 3D, 4D, 5D, 6D, 7D, 8D and 9D. According to an exemplary embodiment, the substrate and cover layer may be integrally formed. See for example FIGS. 14D-14E and 18C.

According to an exemplary embodiment, the set of projections may comprise at least one of (a) a set of projections formed on the door; (b) a set of pins formed on the door; (c) a set of posts formed on the door; (d) a set of members formed on the door; (e) a set of features formed on the door; (f) a set of pegs formed on the door; (g) a rim formed on the door; (h) a support formed on the door; (i) a flange formed on the door. According to an exemplary embodiment, the set of projections may comprise at least one of (a) a set of projections integrally formed on the door; (b) a set of pins integrally formed on the door; (c) a set of posts integrally formed on the door; (d) a set of members integrally formed on the door; (e) a set of features integrally formed on the door; (f) a set of pegs integrally formed on the door; (g) a rim integrally formed on the door; (h) a support integrally formed on the door; (i) a flange integrally formed on the door.

The door may comprise a door assembly; the door assembly may comprise at least one of (a) a cover and a substrate; (b) a cover and a base; (c) a cover structure and a carrier structure; (d) a cover and a carrier structure; (e) a base structure comprising a cover and a substrate comprising the set of projections; (f) a cover and a base structure formed by co-extrusion; (g) a cover and a carrier structure formed by co-extrusion; (h) a cover and a carrier formed by co-extrusion; (i) a cover coupled to a carrier formed by extrusion.

According to an exemplary embodiment, a method of making a component for a vehicle interior comprising a base and a door configured for movement relative to the base to an open position to facilitate access through the opening into a compartment of the base and a set of projections on the door configured to engage a set of guides on the base may comprise the step of forming the door by extrusion of polymer material through a tool. See for example FIGS. 3C-3D, 4C-4D, 5C-5D, 6C-6D, 7C-7D, 8C-8D, 9C-9D, 10C-10D, 11C-11D, 12C-12D, 13C-13D, 14C-14D, 15C-15D, 16C-16D and 17C-17D. The door may comprise a cover and a carrier configured to provide the set of projections; the method may further comprise the step of forming the set of projections on the carrier; the method may further comprise the step of attaching the set of projections to the carrier. See for example FIGS. 2D-2F, 3E, 4E, 5E, 6E, 8E, 9H, 10E, 11E-11F, 12E, 13F, 14F, 15F, 16F, 17F and 18D-18E. According to an exemplary embodiment, the step of forming the door may comprise extruding a polymer material to form the carrier; the step of forming the door further may comprise bonding the cover to the carrier. See for example FIGS. 14A-14E. According to an exemplary embodiment, the step of forming the door may comprise extruding a polymer material to form the cover. See for example FIGS. 10A-10D. The step of forming the door may comprise extruding a first polymer material to form a carrier and extruding a second polymer material to form a cover; the step of forming the door may comprise extruding the first polymer material in a first direction to form the carrier and extruding the second polymer material in a second direction to form the cover. See for example FIGS. 10A-10D. The door may comprise a cover and a carrier configured to provide the set of projections. See for example FIGS. 3B, 4B, 5B, 6B, 7B, 8B, 9B and 10B.

According to an exemplary embodiment, the vehicle interior component may comprise a base providing a compartment with an opening and a door configured for movement relative to the base to an open position to facilitate access through the opening into the compartment of the base and an interface between the base and the door configured to facilitate movement of the door relative to the base; the interface may comprise a set of projections on the door configured to engage a set of guides on the base; the door may comprise a carrier configured to provide the set of projections and a cover. See for example FIGS. 3B, 4B, 5B, 6B, 7B, 8B, 9B, 10B, 11B, 12B, 13B and 14B.

According to an exemplary embodiment, the door may be formed by extrusion. The set of projections may be formed on the carrier. According to an exemplary embodiment, the carrier may be formed by extrusion of a polymer material. According to an exemplary embodiment, the cover may be formed by extrusion of a polymer material. According to an exemplary embodiment, the door may be formed by attachment of the cover to the carrier; the door may be formed by co-extrusion of the cover and the carrier; the cover and the carrier may be integrally formed; the cover may be bonded to the carrier. See for example FIGS. 10A-10D, 14A-14G and 15A-15D, 16A-16D, 17A-17D and 18A-18D.

According to an exemplary embodiment, the set of projections may be formed by extrusion of the carrier; the set of projections may be formed by machining of the carrier; the set of projections may be attached to the carrier. See for example FIGS. 2D-2F, 3E, 4E, 5E, 6E, 8E, 9H, 10E, 11E-11F, 12E, 13F, 14F, 15F, 16F, 17F and 18D-18E. According to an exemplary embodiment, the set of projections may comprise at least one of (a) a set of projections formed on the carrier; (b) a set of pins formed on the carrier; (c) a set of posts formed on the carrier; (d) a set of members formed on the carrier; (e) a set of features formed on the carrier; (f) a set of pegs formed on the carrier; (g) a rim formed on the carrier; (h) a support formed on the carrier; (i) a set of supports formed on the carrier; (j) a flange formed on the carrier; (k) a set of flanges formed on the carrier; (l) a set of projections attached to the carrier; (m) a set of projections attached in a set of apertures on the carrier; (n) a set of projections integrally formed on the carrier; (o) a set of projections formed by machining of the carrier; (p) a set of projections comprising a set of features formed by machining of the carrier. See for example FIGS. 2D-2F, 3E, 4E, 5E, 6E, 8E, 9H, 10E, 11E-11F, 12E, 13F, 14F, 15F, 16F, 17F and 18D-18E.

The door may comprise a door assembly. See for example FIGS. 3A-3B, 4A-4B, 5A-5B, 6A-6B, 7A-7B, 8A-8B, 9A-9B, 10A-10B, 11A-11B, 12A-12B, 13A-13B and 14A-14B. The door assembly may comprise at least one of (a) a cover and a substrate; (b) a cover and a base; (c) a cover structure and a carrier structure; (d) a cover and a carrier structure; (e) a base structure comprising a cover and a substrate comprising the set of projections; (f) a cover and a base structure formed by co-extrusion; (g) a cover and a carrier structure formed by co-extrusion; (h) a cover and a carrier formed by co-extrusion; (i) a cover coupled to a carrier formed by extrusion.

Exemplary Embodiments

According to an exemplary embodiment as shown schematically in FIGS. 1A to 1D, a vehicle V is shown including an interior with a component or floor console FC. Floor console FC may comprise a base B and a cover provided by and/or as a door shown as a tambour door TD. See also generally FIGS. 2A-2D, 3A-3C, 4A-4C, 5A-5C, 6A-6C, 7A-7C, 8A-8C, 9A-9C, 10A-10C, 11A-11C, 12A-12C, 13A-

13C, 14A-14C, 15A-15C, 16A-16C, 17A-17C and 18A-18B (e.g. various arrangements of door/door assembly as and/or providing a cover according to exemplary embodiment).

According to an exemplary embodiment as shown schematically in FIGS. 2A to 2C, a component 1000 (e.g. vehicle trim component, console, center console, floor console, storage compartment, arm rest, etc.) is shown for a vehicle interior. As shown schematically, component 1000 may comprise a base 1010 and a cover provided by and/or as a door shown as a tambour door TD. The cover or door shown as tambour door TD may be configured to conform to the curved structure of the base 1010 as the tambour door TD moves between a closed position and an open position to facilitate access to the storage compartment. According to an exemplary embodiment, a hand H may exert an external force to move the tambour door TD from the closed position to the open position. As shown schematically in FIGS. 2F and 2E, base 1010 may comprise a first wall 1012 and a second wall 2014 opposite first wall 1012. The cover or door shown as tambour door TD may be configured to engage with base 1010 of component 1000.

According to an exemplary embodiment as shown schematically in FIGS. 5A to 5C, a cover 2100 (e.g. provided by or as a door, tambour door, door assembly, shade, blind, roller blind, etc.) is shown. As shown schematically in FIGS. 5A to 5C, cover 2100 may comprise a visible surface 2100v, a mounting aperture 2109, a top layer or substrate 2110, and a bottom layer or pins 2120 (e.g. extensions, projections, pegs, posts, features, etc.). As shown schematically in FIG. 5C, substrate 2110 may comprise a series of substantially parallel ribs 2111. According to an exemplary embodiment, mounting aperture 2109 may be configured to receive a handle or similar structure to help facilitate movement of cover 2100 from a closed position to an open position when cover 2100 is coupled to base 1010. According to an exemplary embodiment, substantially parallel ribs 2111 may be configured to move relative to one another to facilitate bending of cover 2100. According to an exemplary embodiment, pins 2120 may be configured to be bonded to substrate 2110 at each of the substantially parallel ribs 2120. According to an exemplary embodiment, substrate 2110 may be comprised of a first material and pins 2120 may be comprised of a second material different than the first material. According to an exemplary embodiment, pins 2120 may be formed in a single monolithic structure with substrate 2110.

According to an exemplary embodiment as shown schematically in FIGS. 5D and 5E, cover 2100 may be formed by a combination of an extrusion process and a cutting process (e.g. employing tooling, fixtures, etc.). A first polymer material may be extruded through a first extrusion die D11 in a direction substantially perpendicular to a direction of travel of the cover 2100 when cover 2100 is coupled to base 1010 to from a top layer of a precursor (e.g. section or segment of cover/door) 201. A second polymer material may be extruded through a second extrusion die D12 in a direction substantially perpendicular to a direction of travel of the cover 2100 when cover 2100 is coupled to base 1010 to form a bottom layer of a cover precursor 201. As shown schematically in FIG. 5D, first and second extrusion dies D11 and D12 may be configured to allow the first and second polymer materials to pass through the cut out sections (see portions of FIG. 5D without cross hatching). Once the first and second polymer materials pass through first and second extrusion dies D11 and D12 the first and second polymer materials may begin to dry and harden on the opposite side of first and second extrusion dies D11 and D12 into cover precursor 201 with a shape that partially matches a side profile of substrate 2110. According to an exemplary embodiment, the bottom layer may be bonded to the top layer during the extrusion process. According to an exemplary embodiment, extruding the first polymer material through first extrusion die D11 may occur simultaneously with extruding the second polymer material through second extrusion die D12. According to an exemplary embodiment, extruding the second polymer through second extrusion die D12 may be started before extruding the first polymer material through first extrusion die D11 and stopped after extruding the first polymer material through first extrusion die D11 has stopped so as to directly form substrate 2110 into a core and an extension 2100e (see FIGS. 5E and 5F) without employing the cutting process.

According to an exemplary embodiment as shown schematically in FIG. 5E, precursor (e.g. section or segment of cover/door) 201 may be cut with cutting tool CT to cut away portions of cover precursor 201 to form substrate 2110 into a core and an extension 2100e. According to an exemplary embodiment, cutting tool CT may cut in a U-shaped pattern to form extension 2100e. According to an exemplary embodiment, the core may comprise a first thickness and extension 2100e may comprise a second thickness less than the first thickness. According to an exemplary embodiment, extension 2100e may comprise a portion of pins 2120 (e.g. extensions, projections, pegs, posts, features, etc.).

According to an exemplary embodiment as shown schematically in FIG. 5F, door/cover 2100 may be configured to engage with base 1010 to facilitate movement of cover 2100 relative to base 1010 between a closed position and an open position. Extension 2100e may be configured to engage base 1010 and the core may be configured to extend between first wall 1012 and second wall 2014 (see FIG. 2E). According to an exemplary embodiment, pins 2120 may be configured to engage with base 1010. According to an exemplary embodiment, visible surface 2100v, which may be substantially flat and smooth as a result of the extrusion process, may comprise a soft to touch feel from a finger F in comparison to pins 2120 as a result of visible surface 2100v being formed by the first polymer material and pins 2120 being formed by the second polymer material.

Figure 6A:
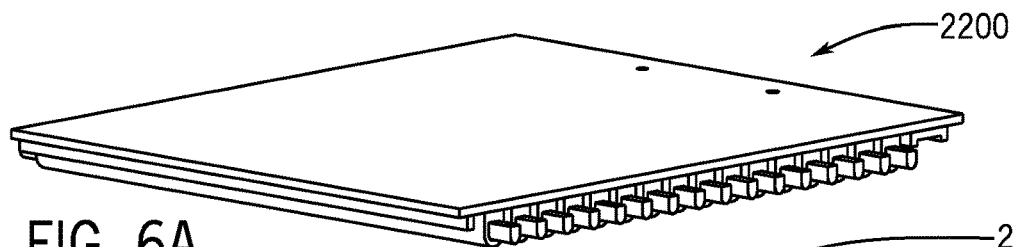
FIG. 6A is a schematic perspective view of a cover for a component of a vehicle interior according to an exemplary embodiment.
Figure 6B:
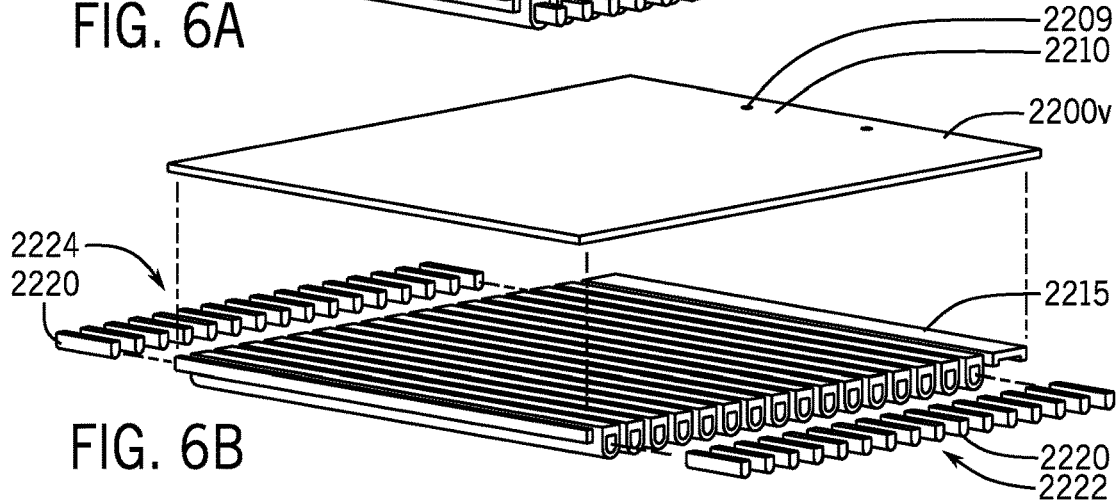
FIG. 6B is a schematic perspective exploded view of a cover for a component of a vehicle interior according to an exemplary embodiment.
Figure 6C:
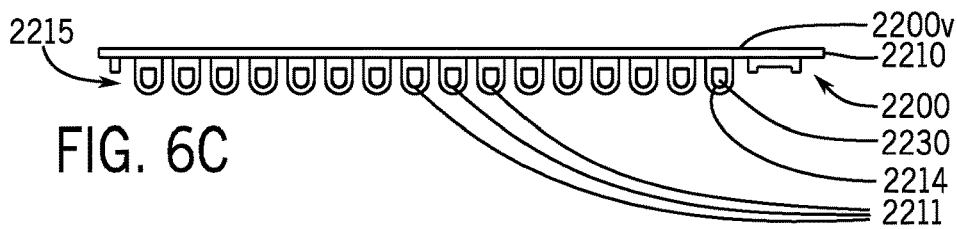
FIG. 6C is a schematic side view of a cover for a component of a vehicle interior according to an exemplary embodiment.

According to an exemplary embodiment as shown schematically in FIGS. 6A to 6C, a cover 2200 (e.g. provided by or as a door, tambour door, door assembly, shade, blind, roller blind, etc.) is shown. As shown schematically in FIGS. 6A to 6C, cover 2200 may comprise a visible surface 2200v, a mounting aperture 2209, a top layer 2210, a bottom layer 2215 (e.g. substrate, layer, platform, carrier, structure, etc.), and pins 2220 (e.g. extensions, projections, pegs, posts, features, etc.). As shown schematically in FIGS. 6B and 6C, visible surface 2200v and mounting aperture 2209 may be integrated with top layer 2210. According to an exemplary embodiment, mounting aperture 2209 may be configured to receive a handle or similar structure to help facilitate movement of cover 2200 from the closed position to the open position when cover 2200 is coupled to base 1010. As shown schematically in FIG. 6C, bottom layer 2215 may comprise a series of substantially parallel ribs 2211 and openings 2214. According to an exemplary embodiment, substantially parallel ribs 2211 may be configured to move relative to one another to facilitate bending of cover 2200. According to an exemplary embodiment, pins 2220 may be configured to be coupled to bottom layer 2215 at openings 2214 (see FIGS. 6B and 6E). According to an exemplary embodiment, pins 2220 may comprise a first set of pins 2222 and a second set of pins 2224. According to an exemplary embodiment, each pin of first and second sets of pins 2222 and 2224 may comprise a first portion configured to couple each of the pins to the openings 2214 and a second portion configured to engage base 1010 (see FIGS. 6B and 6E). According to an exemplary embodiment, pins 2220 may be configured to pass entirely though substrate 2210. According to an exemplary embodiment, first layer 2210 may be comprised of a first material and second layer 2215 may be comprised of a second material different than the first material.

Figure 6D:
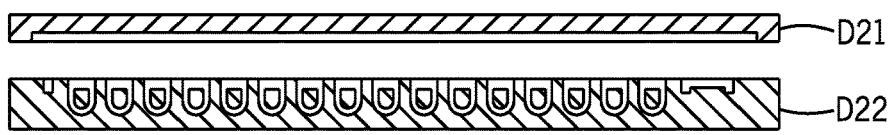
FIG. 6D is a schematic view of first and second extrusion dies for forming a cover for a component of a vehicle interior according to an exemplary embodiment.

According to an exemplary embodiment as shown schematically in FIG. 6D, cover 2200 may be formed by an extrusion process. A first polymer material may be extruded through a first extrusion die D21 in a direction substantially perpendicular to a direction of travel of the cover 2200 when cover 2200 is coupled to base 1010 to top layer 2210. A second polymer material may be extruded through a second extrusion die D22 in a direction substantially perpendicular to a direction of travel of the cover 2200 when cover 2200 is coupled to base 1010 to form bottom layer 2215 (e.g. substrate, layer, platform, carrier, structure, etc.). As shown schematically in FIG. 6D, first and second extrusion dies D21 and D22 may be configured to allow the first and second polymer materials to pass through the cut out sections (see portions of FIG. 6D without cross hatching). Once the first and second polymer materials pass through first and second extrusion dies D21 and D22 the first and second polymer materials may begin to dry and harden on the opposite side of first and second extrusion dies D21 and D22 into top and bottom layers 2210 and 2215. According to an exemplary embodiment, extruding the first polymer material through first extrusion die D21 may occur simultaneously with extruding the second polymer material through second extrusion die D22. According to an exemplary embodiment, bottom layer 2215 may be bonded to top layer 2210 during the extrusion process.

Figure 6F:
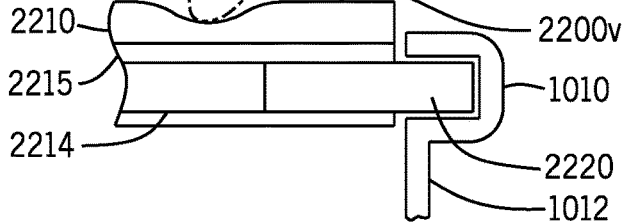
FIG. 6F is a schematic partial section view of a cover for a component of a vehicle interior engaged with a base of the component according to an exemplary embodiment.
Figure 6E:
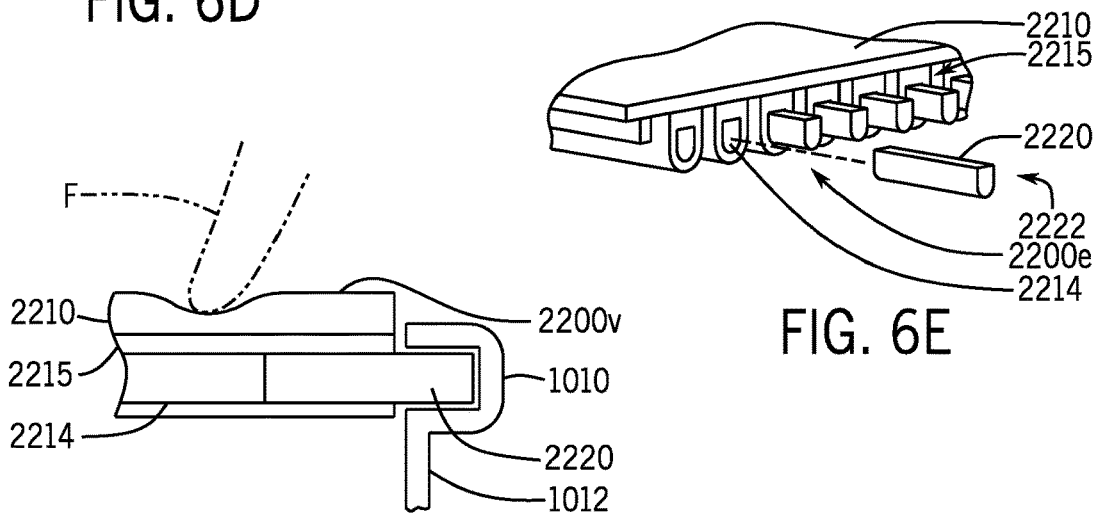
FIG. 6E is a schematic partial perspective view of a cover for a component of a vehicle interior according to an exemplary embodiment.

According to an exemplary embodiment as shown schematically in FIG. 6E, pins 2220 may be inserted into openings 2214 of bonded top and bottom layers 2210 and 2215 to form a core and an extension 2200e. According to an exemplary embodiment, the core may comprise a first thickness and extension 2200e may comprise a second thickness less than the first thickness. According to an exemplary embodiment, extension 2200e may comprise a portion of pins 2220.

According to an exemplary embodiment as shown schematically in FIG. 6F, door/cover 2200 may be configured to engage with base 1010 to facilitate movement of cover 2200 relative to base 1010 between a closed position and an open position. Extension 2200e may be configured to engage base 1010 and the core may be configured to extend between first wall 1012 and second wall 2014 (see FIG. 2E). According to an exemplary embodiment, pins 2220 may be configured to engage with base 1010. According to an exemplary embodiment, visible surface 2200v, which may be substantially flat and smooth as a result of the extrusion process, may comprise a soft to touch feel from a finger F in comparison to bottom layer 2215 as a result of visible surface 2200v being formed by the first polymer material and bottom layer 2215 being formed by the second polymer material.

Figure 7A:
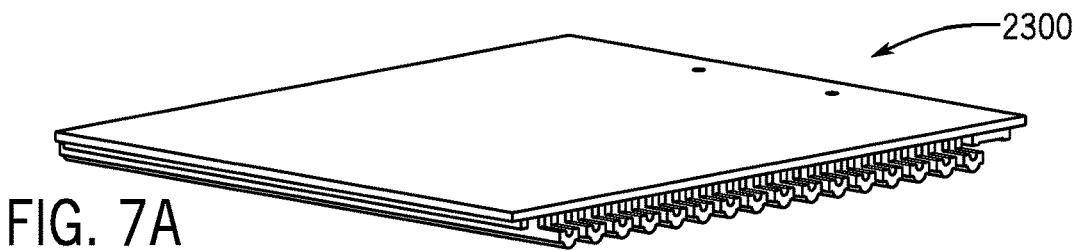
FIG. 7A is a schematic perspective view of a cover for a component of a vehicle interior according to an exemplary embodiment.
Figure 7B:
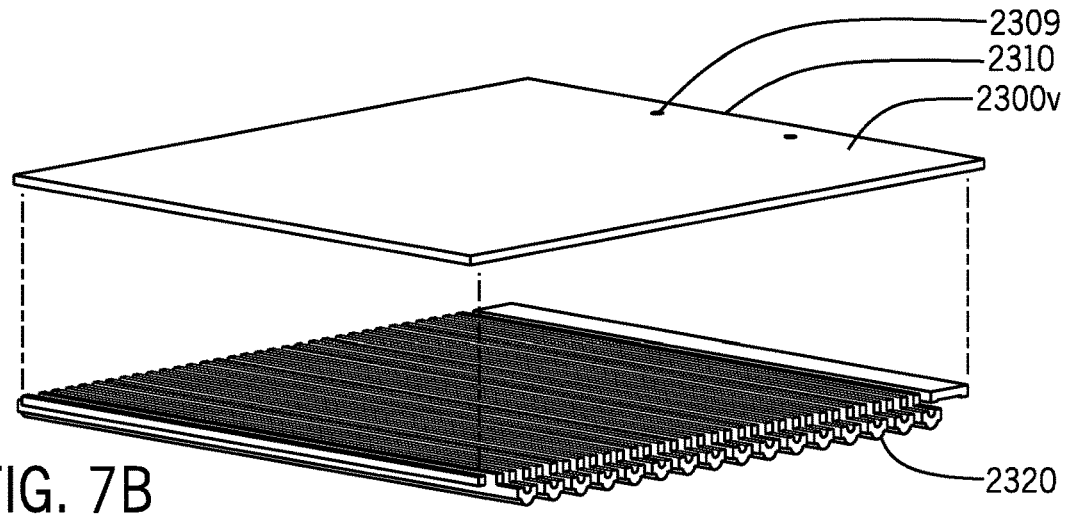
FIG. 7B is a schematic perspective exploded view of a cover for a component of a vehicle interior according to an exemplary embodiment.
Figure 7C:
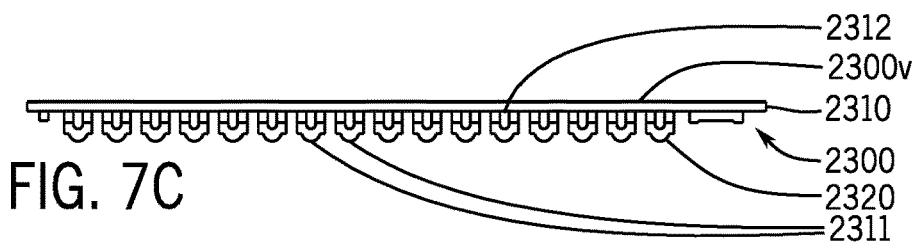
FIG. 7C is a schematic side view of a cover for a component of a vehicle interior according to an exemplary embodiment.

According to an exemplary embodiment as shown schematically in FIGS. 7A to 7C, a cover 2300 (e.g. provided by or as a door, tambour door, door assembly, shade, blind, roller blind, etc.) is shown. As shown schematically in FIGS. 7A to 7C, cover 2300 may comprise a visible surface 2300v, a mounting aperture 2309, a top layer 2310, and a bottom layer 2320. As shown schematically in FIGS. 7B and 7C, visible surface 2300v and mounting aperture 2309 may be integrated with top layer 2310. According to an exemplary embodiment, mounting aperture 2309 may be configured to receive a handle or similar structure to help facilitate movement of cover 2300 from the closed position to the open position when cover 2300 is coupled to base 1010. As shown schematically in FIG. 7C, bottom layer 2320 may comprise a series of substantially parallel ribs 2111. According to an exemplary embodiment, substantially parallel ribs 2311 may be configured to move relative to one another to facilitate bending of cover 2300. According to an exemplary embodiment, bottom layer 2320 may be configured to be bonded to top layer 2310. According to an exemplary embodiment, top layer 2310 may be comprised of a first material and bottom layer 2320 may be comprised of a second material different than the first material. According to an exemplary embodiment, bottom layer 2320 may be formed in a single monolithic structure with top layer 2310.

Figure 7D:
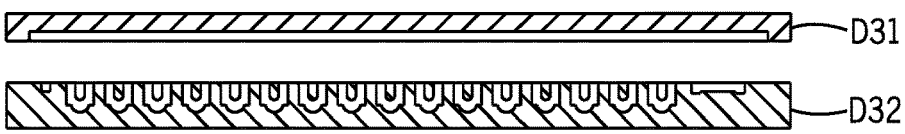
FIG. 7D is a schematic view of first and second extrusion dies for forming a cover for a component of a vehicle interior according to an exemplary embodiment.
Figure 7E:
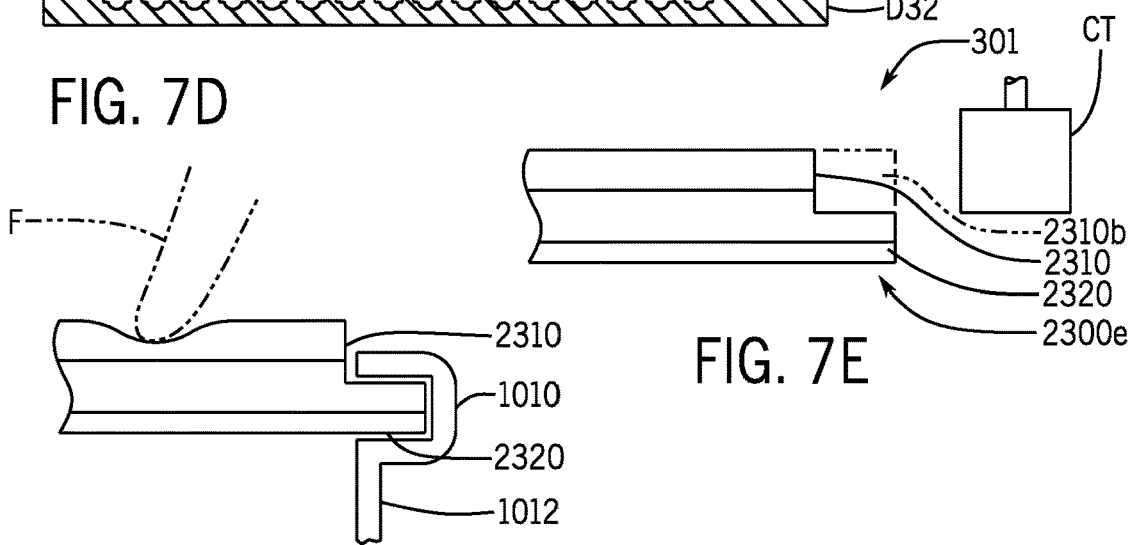
FIG. 7E is a schematic partial section view of a cover precursor for a component of a vehicle interior according to an exemplary embodiment.

According to an exemplary embodiment as shown schematically in FIGS. 7D and 7E, cover 2300 may be formed by a combination of an extrusion process and a cutting process (e.g. employing tooling, fixtures, etc.). A first polymer material may be extruded through a first extrusion die D31 in a direction substantially perpendicular to a direction of travel of the cover 2300 when cover 2300 is coupled to base 1010 to from a top layer of a precursor (e.g. section or segment of cover/door) 301. A second polymer material may be extruded through a second extrusion die D32 in a direction substantially perpendicular to a direction of travel of the cover 2300 when cover 2300 is coupled to base 1010 to form a bottom layer of a cover precursor 301. As shown schematically in FIG. 7D, first and second extrusion dies D31 and D32 may be configured to allow the first and second polymer materials to pass through the cut out sections (see portions of FIG. 7D without cross hatching). Once the first and second polymer materials pass through first and second extrusion dies D31 and D32 the first and second polymer materials may begin to dry and harden on the opposite side of first and second extrusion dies D31 and D32 into cover precursor 301 with a shape that partially matches a side profile of cover 2300. According to an exemplary embodiment, the bottom layer may be bonded to the top layer during the extrusion process. According to an exemplary embodiment, extruding the first polymer material through first extrusion die D31 may occur simultaneously with extruding the second polymer material through second extrusion die D32. According to an exemplary embodiment, extruding the second polymer through second extrusion die D32 may be started before extruding the first polymer material through first extrusion die D31 and stopped after extruding the first polymer material through first extrusion die D31 has stopped so as to directly form top layer 2310 into a core and an extension 2300e (see FIGS. 7E and 7F) without employing the cutting process.

According to an exemplary embodiment as shown schematically in FIG. 7E, cover precursor 301 may be cut with cutting tool CT to cut away a portion 2310B of cover precursor 301 to form top layer 2310 into the core and extension 2300e. According to an exemplary embodiment, cutting tool CT may cut in a level path perpendicular to a front face of cover precursor 301 to form extension 2300e. According to an exemplary embodiment, the core may comprise a first thickness and extension 2300e may comprise a second thickness less than the first thickness.

Figure 7F:
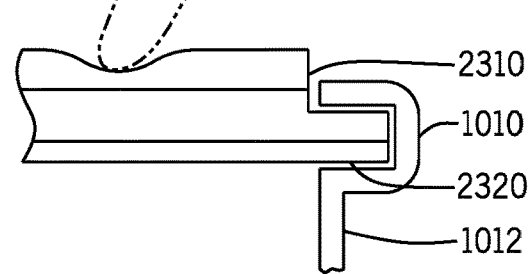
FIG. 7F is a schematic partial section view of a cover for a component of a vehicle interior engaged with a base of the component according to an exemplary embodiment.

According to an exemplary embodiment as shown schematically in FIG. 7F, door/cover 2300 may be configured to engage with base 1010 to facilitate movement of cover 2300 relative to base 1010 between a closed position and an open position. Extension 2300e may be configured to engage base 1010 and the core may be configured to extend between first wall 1012 and second wall 2014 (see FIG. 2E). According to an exemplary embodiment, visible surface 2300v, which may be substantially flat and smooth as a result of the extrusion process, may comprise a soft to touch feel from a finger F in comparison to bottom layer 2320 as a result of the visible surface 2300v being formed by the first polymer material and bottom layer 2320 being formed by the second polymer material.

Figure 8A:
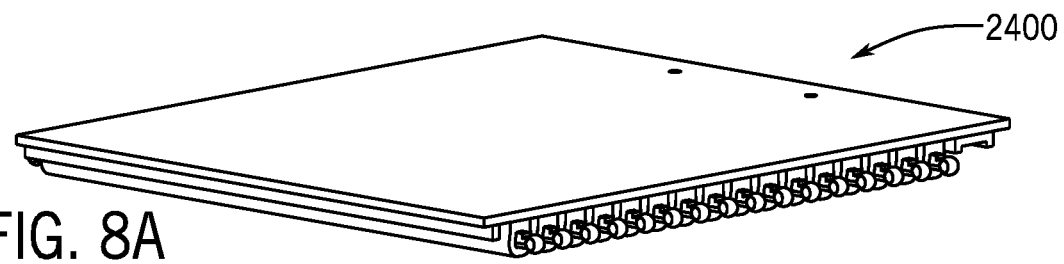
FIG. 8A is a schematic perspective view of a cover for a component of a vehicle interior according to an exemplary embodiment.
Figure 8B:
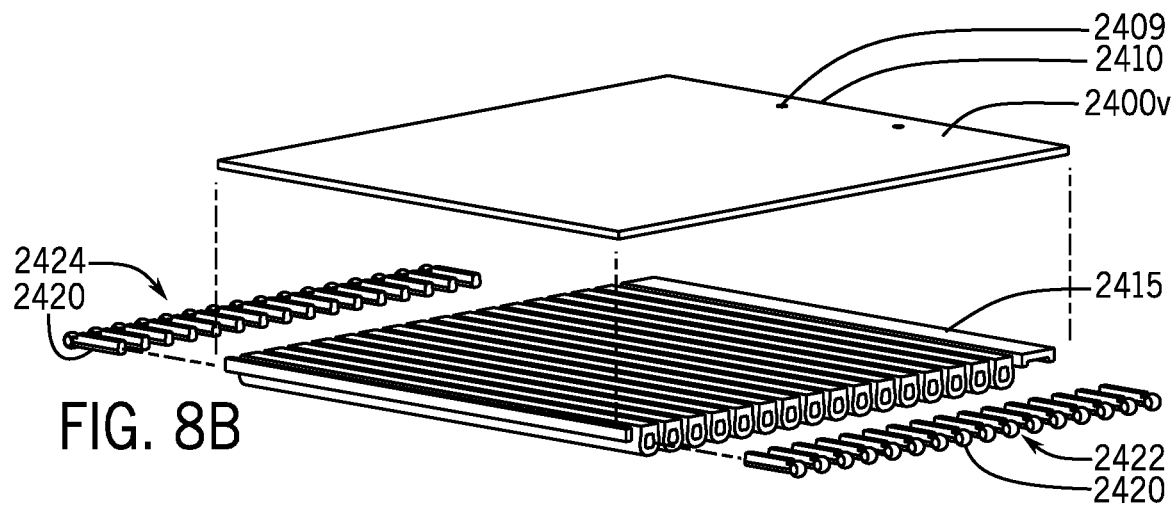
FIG. 8B is a schematic perspective exploded view of a cover for a component of a vehicle interior according to an exemplary embodiment.
Figure 8C:
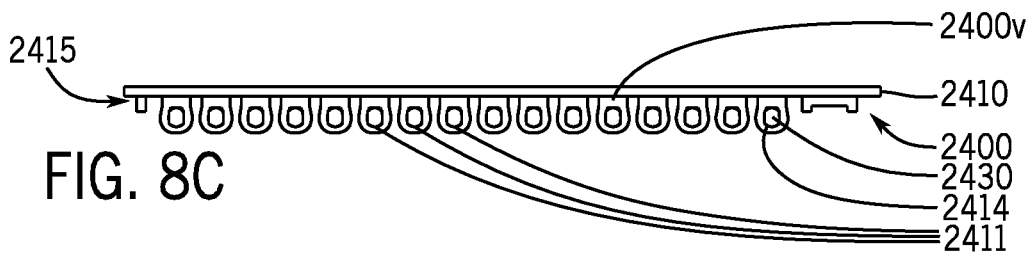
FIG. 8C is a schematic side view of a cover for a component of a vehicle interior according to an exemplary embodiment.

According to an exemplary embodiment as shown schematically in FIGS. 8A to 8C, a cover 2400 (e.g. provided by or as a door, tambour door, door assembly, shade, blind, roller blind, etc.) is shown. As shown schematically in FIGS. 8A to 8C, cover 2400 may comprise a visible surface 2400v, a mounting aperture 2409, a top layer 2410, a bottom layer 2415 (e.g. substrate, layer, platform, carrier, structure, etc.), and pins 2420 (e.g. extensions, projections, pegs, posts, features, etc.). As shown schematically in FIGS. 8B and 8C, visible surface 2400v and mounting aperture 2409 may be integrated with top layer 2410. According to an exemplary embodiment, mounting aperture 2409 may be configured to receive a handle or similar structure to help facilitate movement of cover 2400 from the closed position to the open position when cover 2400 is coupled to base 1010. As shown schematically in FIG. 8C, bottom layer 2415 may comprise a series of substantially parallel ribs 2411 and openings 2414. According to an exemplary embodiment, substantially parallel ribs 2411 may be configured to move relative to one another to facilitate bending of cover 2400. According to an exemplary embodiment, top layer 2410 may be comprised of a first material and bottom layer 2415 may be comprised of a second material different than the first material.

Figure 8D:
FIG. 8D is a schematic view of first and second extrusion dies for forming a cover for a component of a vehicle interior according to an exemplary embodiment.
Figure 8D:
Figure 8F:
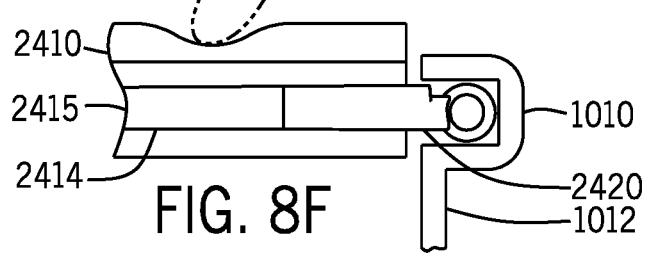
FIG. 8F is a schematic partial section view of a cover for a component of a vehicle interior engaged with a base of the component according to an exemplary embodiment.
Figure 8E:
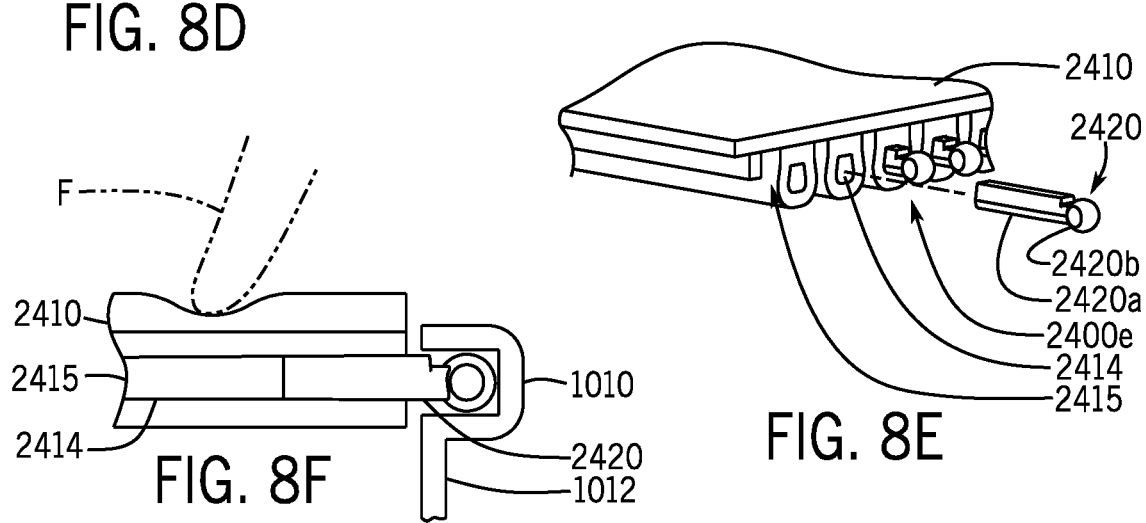
FIG. 8E is a schematic perspective partial view of a cover for a component of a vehicle interior according to an exemplary embodiment.

According to an exemplary embodiment, pins 2420 may be configured to be coupled to bottom layer 2415 at openings 2414 (see FIGS. 8B and 8E). According to an exemplary embodiment as shown schematically in FIGS. 8C and 8E, substantially parallel ribs 2411 may be configured in a tear drop shape and openings 2414 may also be configured in a tear drop shape to increase surface contact with pins 2420. According to an exemplary embodiment, pins 2420 may comprise a first set of pins 2422 and a second set of pins 2424. According to an exemplary embodiment, each pin of first and second sets of pins 2422 and 2424 may comprise a first portion 2420a configured to couple each of the pins to the openings 2414 and a second portion 2420b configured to engage base 1010 (see FIGS. 8B and 8E). According to an exemplary embodiment, second portion 2420b may be substantially spherical.

According to an exemplary embodiment as shown schematically in FIG. 8D, cover 2400 may be formed by an extrusion process. A first polymer material may be extruded through a first extrusion die D41 in a direction substantially perpendicular to a direction of travel of the cover 2400 when cover 2400 is coupled to base 1010 to form top layer 2410. A second polymer material may be extruded through a second extrusion die D42 in a direction substantially perpendicular to a direction of travel of cover 2400 when cover 2400 is coupled to base 1010 to form bottom layer 2415. As shown schematically in FIG. 8D, first and second extrusion dies D41 and D42 may be configured to allow the first and second polymer materials to pass through the cut out sections (see portions of FIG. 8D without cross hatching). Once the first and second polymer materials pass through first and second extrusion dies D41 and D42 the first and second polymer materials may begin to dry and harden on the opposite side of first and second extrusion dies D41 and D42 into top and bottom layers 2410 and 2415. According to an exemplary embodiment, extruding the first polymer material through first extrusion die D41 may occur simultaneously with extruding the second polymer material through second extrusion die D42. According to an exemplary embodiment, bottom layer 2415 may be bonded to top layer 2410 during the extrusion process.

According to an exemplary embodiment as shown schematically in FIG. 8E, pins 2420 may be inserted into openings 2414 of bonded top and bottom layers 2410 and 2415 to form a core and an extension 2400e. According to an exemplary embodiment, the core may comprise a first thickness and extension 2400e may comprise a second thickness less than the first thickness. According to an exemplary embodiment, extension 2400e may comprise a portion of pins 2420.

According to an exemplary embodiment as shown schematically in FIG. 8F, door/cover 2400 may be configured to engage with base 1010 to facilitate movement of cover 2400 relative to base 1010 between a closed position and an open position. Extension 2400e may be configured to engage base 1010 and the core may be configured to extend between first wall 1012 and second wall 2014 (see FIG. 2E). According to an exemplary embodiment, pins 2420 may be configured to engage with base 1010. According to an exemplary embodiment, visible surface 2400v, which may be substantially flat and smooth as a result of the extrusion process, may comprise a soft to touch feel from a finger F in comparison to bottom layer 2415 as a result of the visible surface 2400v being formed by the first polymer and bottom layer 2415 being formed by the second polymer material.

Figure 9A:
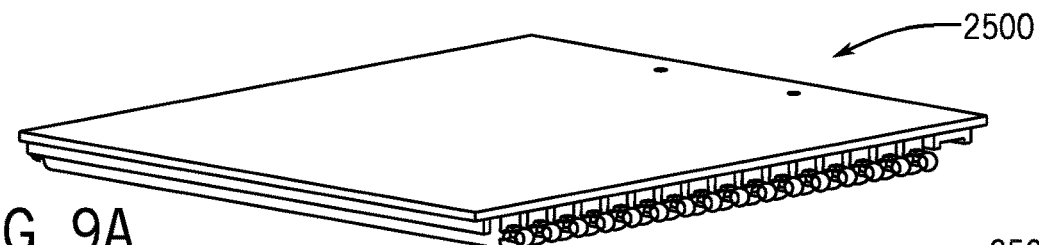
FIG. 9A is a schematic perspective view of a cover for a component of a vehicle interior according to an exemplary embodiment.
Figure 9B:
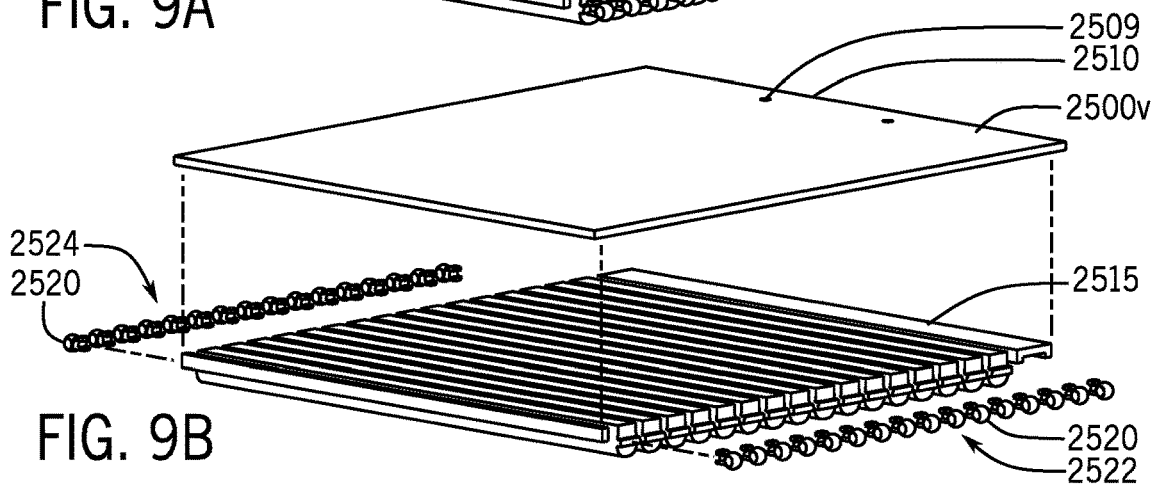
FIG. 9B is a schematic perspective exploded view of a cover for a component of a vehicle interior according to an exemplary embodiment.
Figure 9C:
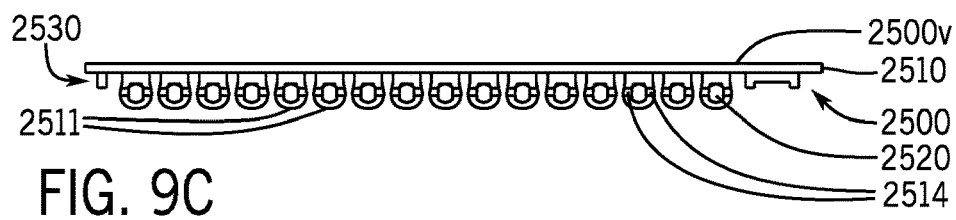
FIG. 9C is a schematic side view of a cover for a component of a vehicle interior according to an exemplary embodiment.

According to an exemplary embodiment as shown schematically in FIGS. 9A to 9C, a cover 2500 (e.g. provided by or as a door, tambour door, door assembly, shade, blind, roller blind, etc.) is shown. As shown schematically in FIGS. 9A to 9C, cover 2500 may comprise a visible surface 2500v, a mounting aperture 2509, a top layer 2510, a bottom layer 2515 (e.g. substrate, layer, platform, carrier, structure, etc.), and pins 2520 (e.g. extensions, projections, pegs, posts, features, etc.). As shown schematically in FIGS. 9B and 9C, visible surface 2500v and mounting aperture 2509 may be integrated with top layer 2510. According to an exemplary embodiment, mounting aperture 2509 may be configured to receive a handle or similar structure to help facilitate movement of cover 2500 from the closed position to the open position when cover 2500 is coupled to base 1010. As shown schematically in FIG. 9C, bottom layer 2515 may comprise a series of substantially parallel ribs 2511 and protrusions 2514. According to an exemplary embodiment, substantially parallel ribs 2511 may be configured to move relative to one another to facilitate bending of cover 2500. According to an exemplary embodiment, top layer 2510 may be comprised of a first material and bottom layer 2515 may be comprised of a second material different than the first material.

Figure 9D:
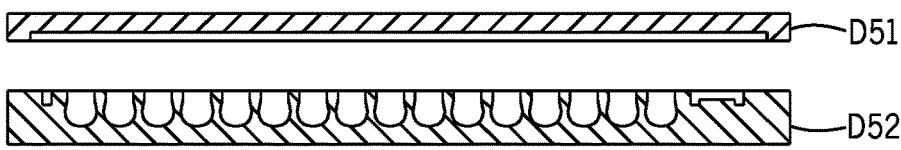
FIG. 9D is a schematic view of first and second extrusion dies for forming a cover for a component of a vehicle interior according to an exemplary embodiment.
Figures 9E, 9H:
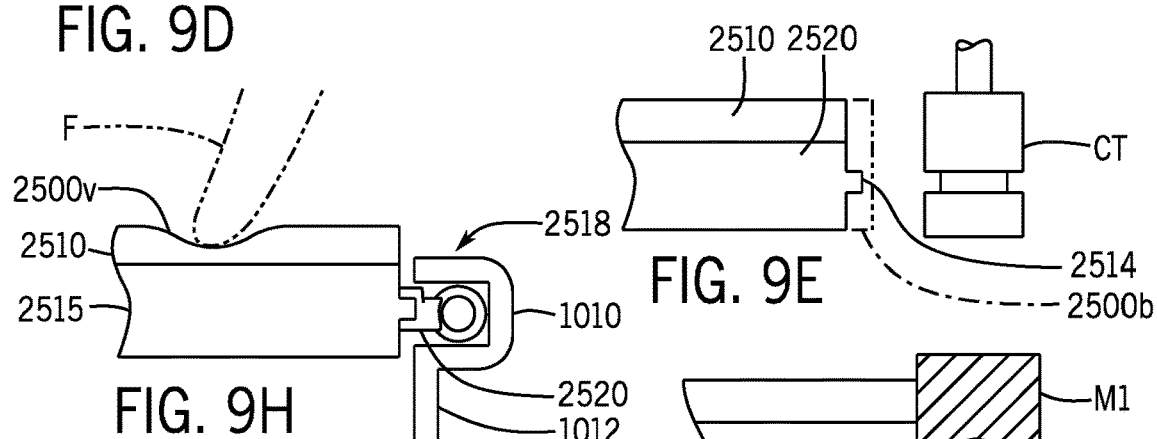
FIG. 9E is a schematic partial side view of a cover precursor for a component of a vehicle interior according to an exemplary embodiment.
FIG. 9H is a schematic partial section view of a cover for a component of a vehicle interior engaged with a base of the component according to an exemplary embodiment.
Figure 9F:
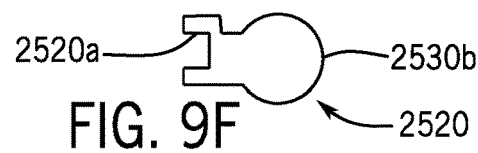
FIG. 9F is a schematic partial side view of a pin of a cover for a component of a vehicle interior according to an exemplary embodiment.

According to an exemplary embodiment, pins 2520 may be configured to be coupled to bottom layer 2515 at protrusions 2514 (see FIGS. 9B and 9H). According to an exemplary embodiment as shown schematically in FIG. 9C, substantially parallel ribs 2511 may be configured in a tear drop shape. According to an exemplary embodiment, pins 2520 may comprise a first set of pins 2522 and a second set of pins 2524. According to an exemplary embodiment, each pin of first and second sets of pins 2522 and 2524 may comprise a first portion 2520a configured to couple each of the pins to the protrusions 2514 and a second portion 2520b configured to engage base 1010 (see FIGS. 9B and 9H). According to an exemplary embodiment, second portion 2520b may be substantially spherical.

Figure 9G:
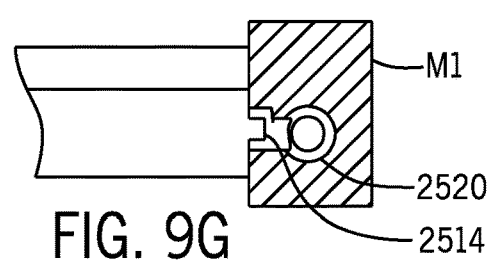
FIG. 9G is a schematic partial section view of a cover precursor for a component of a vehicle interior coupled to a mold for a pin of the cover for the component according to an exemplary embodiment.

According to an exemplary embodiment as shown schematically in FIGS. 9D, 9E, and 9G, door/cover 2500 may be formed by a combination of an extrusion process, a cutting process, and a molding process. A first polymer material may be extruded through a first extrusion die D51 in a direction substantially perpendicular to a direction of travel of the cover 2500 when cover 2500 is coupled to base 1010 to form top layer 2510. A second polymer material may be extruded through a second extrusion die D52 in a direction substantially perpendicular to a direction of travel of cover 2500 when cover 2500 is coupled to base 1010 to form bottom layer 2515 (e.g. substrate, layer, platform, carrier, structure, etc.). As shown schematically in FIG. 9D, first and second extrusion dies D51 and D52 may be configured to allow the first and second polymer materials to pass through the cut out sections (see portions of FIG. 9D without cross hatching). Once the first and second polymer materials pass through first and second extrusion dies D51 and D52, the first and second polymer materials may begin to solidify (e.g. form, set/cure, dry and harden, etc.) on the opposite side of first and second extrusion dies D51 and D52 into top and bottom layers 2510 and 2515. According to an exemplary embodiment, extruding the first polymer material through first extrusion die D51 may occur simultaneously with extruding the second polymer material through second extrusion die D52. According to an exemplary embodiment, bottom layer 2515 may be bonded to top layer 2510 during the extrusion process.

According to an exemplary embodiment as shown schematically in FIG. 9E, bonded together top and bottom layers 2510 and 2520 may be cut with cutting tool CT to cut away portions 2500b to form protrusions 2514. A mold M1 may be coupled to protrusions 2514. Using mold M1, pins 2520 may be over-molded directly on to protrusions 2514 so as to divide top and bottom layers 2510 and 2520 into a core and an extension 2500e (see FIG. 9H). According to an exemplary embodiment, the core may comprise a first thickness and extension 2500e may comprise a second thickness less than the first thickness. According to an exemplary embodiment, extension 2500e may comprise a portion of pins 2520.

According to an exemplary embodiment as shown schematically in FIG. 9H, cover 2500 may be configured to engage with base 1010 to facilitate movement of cover 2500 relative to base 1010 between a closed position and an open position. Extension 2500e may be configured to engage base 1010 and the core may be configured to extend between first wall 1012 and second wall 2014 (see FIG. 2E). According to an exemplary embodiment, pins 2520 may be configured to engage with base 1010. According to an exemplary embodiment, visible surface 2500v, which may be substantially flat and smooth as a result of the extrusion process, may comprise a soft to touch feel from a finger F in comparison to bottom layer 2515 as a result of visible surface 2500v being formed by the first polymer and bottom layer 2515 being formed by the second polymer material.

According to an exemplary embodiment shown schematically in FIGS. 10A to 10C, a cover 2600 (e.g. provided by or as a door, tambour door, door assembly, shade, blind, roller blind, etc.) is shown. As shown schematically in FIGS. 10A to 10C, cover 2600 may comprise a visible surface 2600v, a top layer 2610, and a bottom layer 2615 (e.g. substrate, layer, platform, carrier, structure, etc.). As shown schematically in FIGS. 10B and 10C, visible surface 2600v may be integrated with top layer 2610 and may comprise a curved top profile. As shown schematically in FIG. 10C, top layer 2610 may comprise a series of substantially parallel ribs 2611. According to an exemplary embodiment, substantially parallel ribs 2611 may be configured to support top layer 2610. According to an exemplary embodiment, bottom layer 2615 may comprise a set of pins 2620 that may be configured to facilitate bending of cover 2600. According to an exemplary embodiment, bottom layer 2615 may comprise a symmetrical form (e.g. halves, etc.) that may be bonded to opposed sides of top layer 2610. According to an exemplary embodiment, top layer 2610 may be comprised of a first material and bottom layer 2615 may be comprised of a second material different than the first material.

According to an exemplary embodiment as shown schematically in FIGS. 10D and 10E, cover 2600 may be formed by a combination of an extrusion process and a cutting process (e.g. employing tooling, fixtures, etc.). A first polymer material may be extruded through a first extrusion die D61 in a direction substantially parallel to a direction of travel of the cover 2600 when cover 2600 is coupled to base 1010 to form top layer 2610. A second polymer material may be extruded through a second extrusion die D62 in a direction substantially parallel to a direction of travel of cover 2600 when cover 2600 is coupled to base 1010 to form bottom layer 2615. As shown schematically in FIG. 10D, first and second extrusion dies D61 and D62 may be configured to allow the first and second polymer materials to pass through the cut out sections (see portions of FIG. 10D without cross hatching). Once the first and second polymer materials pass through first and second extrusion dies D61 and D62, the first and second polymer materials may begin to solidify (e.g. form, set/cure, dry and harden, etc.) on the opposite side of first and second extrusion dies D61 and D62 into a precursor (e.g. section or segment of cover/door) 601 comprising top and bottom layers 2610 and 2615. According to an exemplary embodiment, extruding the first polymer material through first extrusion die D61 may occur simultaneously with extruding the second polymer material through second extrusion die D62. According to an exemplary embodiment, bottom layer 2615 may be bonded to top layer 2610 during the extrusion process.

As shown schematically in FIG. 10D, cover precursor 601 may be cut with cutting tool CT to cut away portions of cover precursor 601 to form pins 2620 in bottom layer 2615. According to an exemplary embodiment first portions 2620a of pins 2620 may be formed by cutting tool CT cutting away portions of bottom layer 2615 to form second portions 2620b of pins 2620 (e.g. extensions, projections, pegs, posts, features, etc.). As shown schematically in FIG. 10F, door/cover 2600 may be configured to engage with base 1010 to facilitate movement of cover 2600 relative to base 1010 between a closed position and an open position. According to an exemplary embodiment, visible surface 2600v, which may be substantially flat and smooth as a result of the extrusion process, may comprise a soft to touch feel from a finger F in comparison to bottom layer 2615 as a result of visible surface 2600v being formed by the first polymer and bottom layer 2615 being formed by the second polymer material.

Figure 11A:
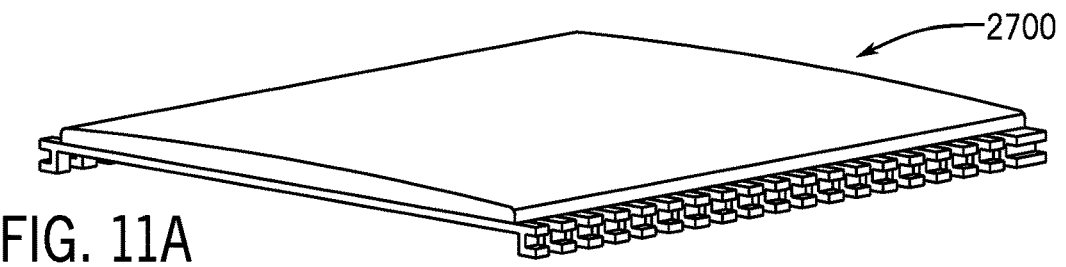
FIG. 11A is a schematic perspective view of a cover for a component of a vehicle interior according to an exemplary embodiment.
Figure 11B:
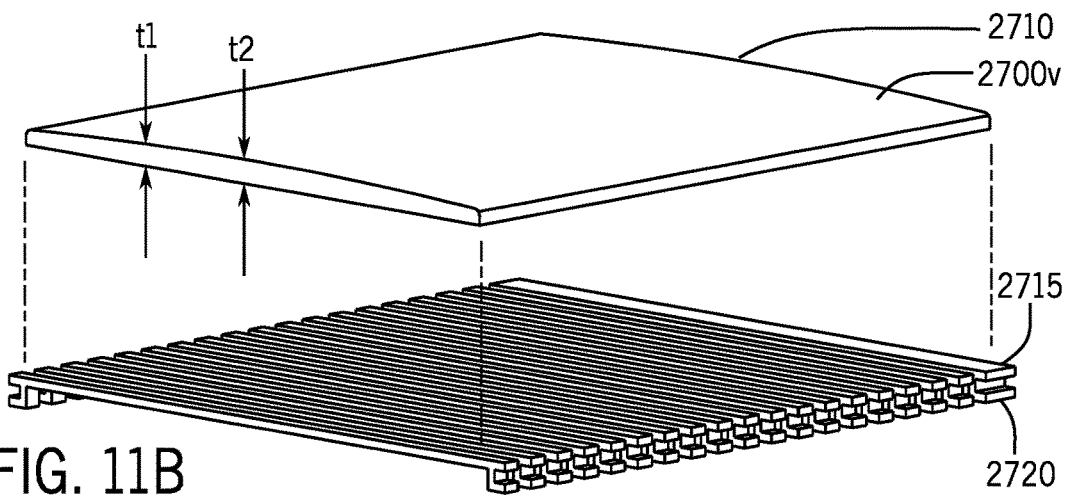
FIG. 11B is a schematic perspective view of a cover for a component of a vehicle interior according to an exemplary embodiment.
Figure 11C:
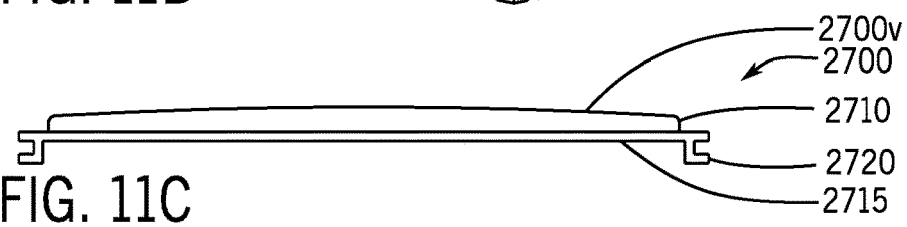
FIG. 11C is a schematic front view of a cover for a component of a vehicle interior according to an exemplary embodiment.

According to an exemplary embodiment as shown schematically in FIGS. 11A to 11B, a cover 2700 (e.g. provided by or as a door, tambour door, door assembly, shade, blind, roller blind, etc.) is shown. As shown schematically in FIGS. 11A to 11C, cover 2700 may comprise a visible surface 2700v, a top layer 2710, and a bottom layer 2715 (e.g. substrate, layer, platform, carrier, structure, etc.). As shown schematically in FIGS. 11B and 11C, visible surface 2700v may be integrated with top layer 2710 and may comprise a curved top profile. As shown schematically in FIG. 11C, top layer 2710 may comprise a variable thickness. According to an exemplary embodiment top layer 2710 may have a maximum thickness t2 at the center, a minimum thickness at the edge, and an intermediate thickness t1 in between the center and the edge. According to an exemplary embodiment, bottom layer 2715 may comprise a set of pins 2720 that may be configured to facilitate bending of cover 2700. According to an exemplary embodiment, top layer 2710 may be comprised of a first material and bottom layer 2715 may be comprised of a second material different than the first material.

Figure 11D:
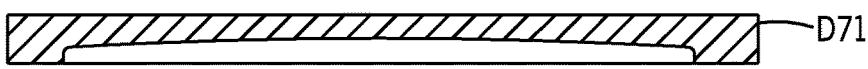
FIG. 11D is a schematic view of first and second extrusion dies for forming a cover for a component of a vehicle interior according to an exemplary embodiment.
Figure 11D:
Figure 11F:
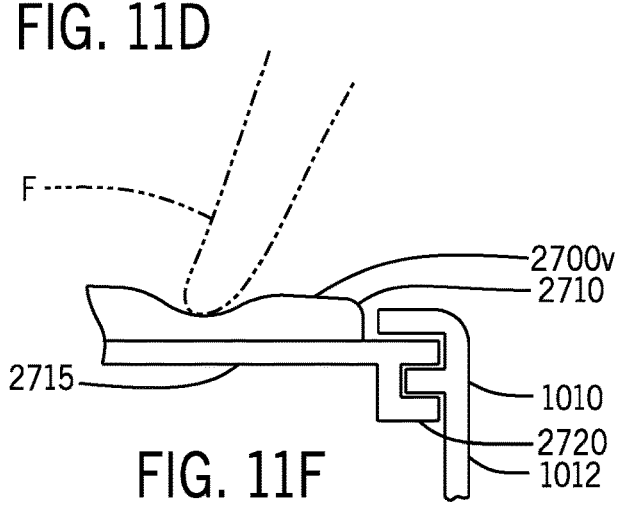
FIG. 11F is a schematic partial section view of a cover for a component of a vehicle interior engaged with a base of the component according to an exemplary embodiment.
Figure 11E:
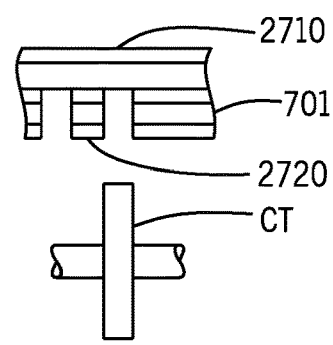
FIG. 11E is a schematic partial top view of a cover precursor for a component of a vehicle interior according to an exemplary embodiment.

According to an exemplary embodiment as shown schematically in FIGS. 11D and 11E, cover 2700 may be formed by a combination of an extrusion process and a cutting process (e.g. employing tooling, fixtures, etc.). A first polymer material may be extruded through a first extrusion die D71 in a direction substantially parallel to a direction of travel of the cover 2700 when cover 2700 is coupled to base 1010 to form top layer 2710. A second polymer material may be extruded through a second extrusion die D72 in a direction substantially parallel to a direction of travel of cover 2700 when cover 2700 is coupled to base 1010 to form bottom layer 2715. As shown schematically in FIG. 11D, first and second extrusion dies D71 and D72 may be configured to allow the first and second polymer materials to pass through the cut out sections (see portions of FIG. 11D without cross hatching). Once the first and second polymer materials pass through first and second extrusion dies D71 and D72, the first and second polymer materials may begin to solidify (e.g. form, set/cure, dry and harden, etc.) on the opposite side of first and second extrusion dies D71 and D72 into a precursor (e.g. section or segment of cover/door) 701 comprising top and bottom layers 2710 and 2715. According to an exemplary embodiment, extruding the first polymer material through first extrusion die D71 may occur simultaneously with extruding the second polymer material through second extrusion die D72. According to an exemplary embodiment, bottom layer 2715 may be bonded to top layer 2710 during the extrusion process.

According to an exemplary embodiment as shown schematically in FIG. 11D, cover precursor 701 may be cut with cutting tool CT to cut away portions of cover precursor 701 to form pins 2720 in bottom layer 2715. According to an exemplary embodiment, cutting tool CT may periodically cut in a direction parallel to a front face of cover precursor 701. As shown schematically in FIG. 11F, door/cover 2700 may be configured to engage with base 1010 to facilitate movement of cover 2700 relative to base 1010 between a closed position and an open position. According to an exemplary embodiment, visible surface 2700v, which may be substantially flat and smooth as a result of the extrusion process, may comprise a soft to touch feel from a finger F in comparison to bottom layer 2715 as a result of visible surface 2700v being formed by the first polymer and bottom layer 2715 being formed by the second polymer material.

Figure 12A:
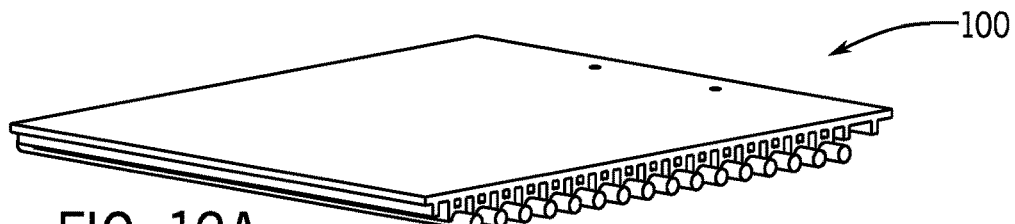
FIG. 12A is a schematic perspective view of a cover for a component of a vehicle interior according to an exemplary embodiment.
Figure 12B:
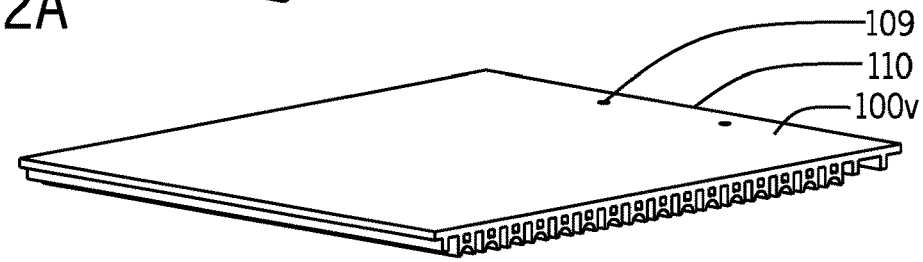
FIG. 12B is a schematic perspective exploded view of a cover for a component of a vehicle interior according to an exemplary embodiment.
Figure 12C:
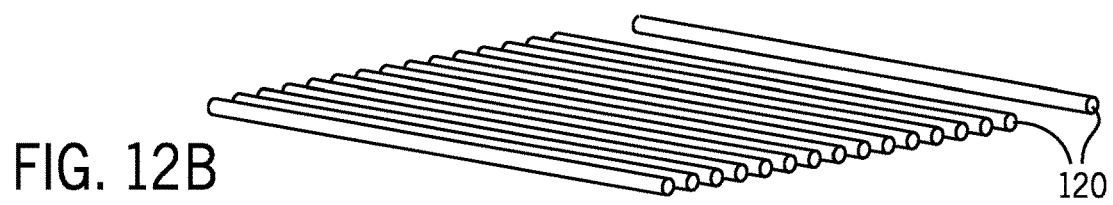
FIG. 12C is a schematic side view of a cover for a component of a vehicle interior according to an exemplary embodiment.

According to an exemplary embodiment as shown schematically in FIGS. 12A to 12C, a cover 100 (e.g. provided by or as a door, tambour door, door assembly, shade, blind, roller blind, etc.) is shown. As shown schematically in FIGS. 12A to 12C, cover 100 may comprise a visible surface 100v, a mounting aperture 109, a substrate 110, and pins 120 (e.g. extensions, projections, pegs, posts, features, etc.). As shown schematically in FIG. 12C, substrate 110 may comprise a series of substantially parallel ribs 111. According to an exemplary embodiment, mounting aperture 109 may be configured to receive a handle or similar structure to help facilitate movement of cover 100 from the closed position to the open position when cover 100 is coupled to base 1010. Substantially parallel ribs 111 may comprise apertures 112. According to an exemplary embodiment, substantially parallel ribs 111 may be configured to move relative to one another to facilitate bending of cover 100. According to an exemplary embodiment, pins 120 may be configured to be bonded to substrate 110 at each of the substantially parallel ribs 120. According to an exemplary embodiment, pins 120 may be formed in a single monolithic structure with the substrate 110.

Figure 12D:
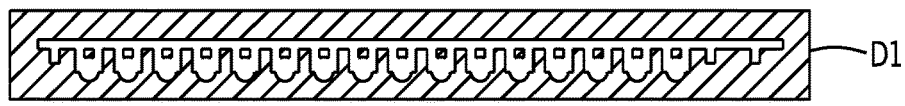
FIG. 12D is a schematic view of an extrusion die for forming a cover for a component of a vehicle interior according to an exemplary embodiment.
Figure 12E:
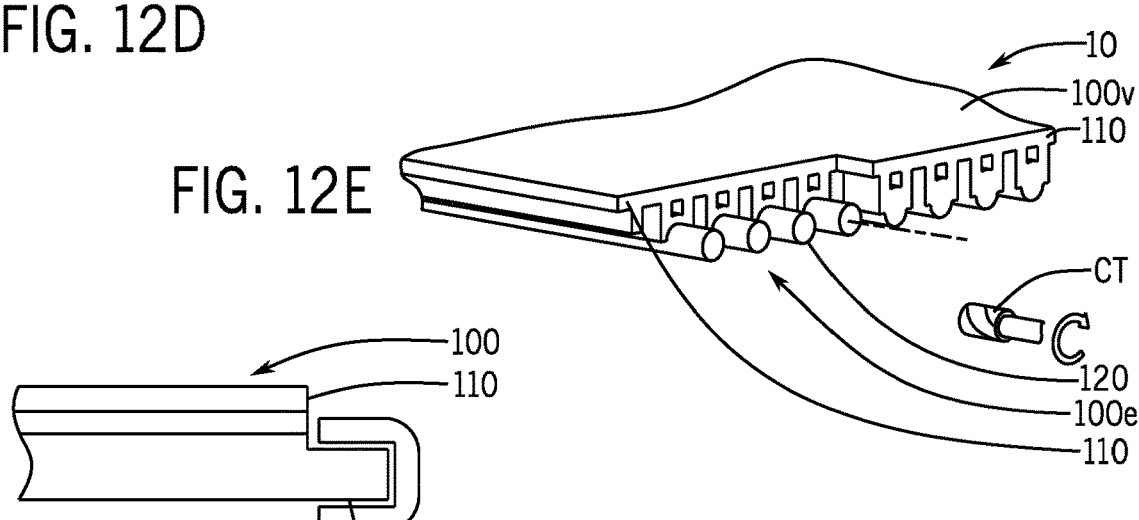
FIG. 12E is a schematic partial perspective view of a cover precursor for a component of a vehicle interior according to an exemplary embodiment.

According to an exemplary embodiment as shown schematically in FIGS. 12D and 12E, door/cover 100 may be formed by a combination of an extrusion process and a cutting process (e.g. employing tooling, fixtures, etc.). A polymer material may be extruded through a tool/machine shown as comprising an extrusion die D1 in a direction substantially perpendicular to a direction of travel of the cover 100 when cover 100 is coupled to base 1010. As shown schematically in FIG. 12D, extrusion die D1 may be configured to allow the polymer material to pass through the cut out sections (see portions of FIG. 12D without cross hatching). Once the polymer material passes through extrusion die D1 the material may begin to solidify (e.g. form, set/cure, dry and harden, etc.) on the opposite side of extrusion die D1 into a precursor (e.g. section or segment of cover/door) 10 with a shape that partially matches a side profile of substrate 110. According to an exemplary embodiment, pins 120 may be bonded to substrate 110 during the extrusion process.

According to an exemplary embodiment as shown schematically in FIG. 12E, cover precursor 10 may include visible surface 100v which may be substantially flat and smooth as a result of the extrusion process and the presence of the apertures 112. Cover precursor 10 may then be cut with cutting tool CT to cut away portions of cover precursor 10 to form substrate 110 into a core and an extension 100e. According to an exemplary embodiment, cutting tool CT may cut in a U-shaped pattern to form extension 100e. According to an exemplary embodiment, the core may comprise a first thickness and extension 100e may comprise a second thickness less than the first thickness. According to an exemplary embodiment, extension 100e may comprise a portion of pins 120.

Figure 12F:
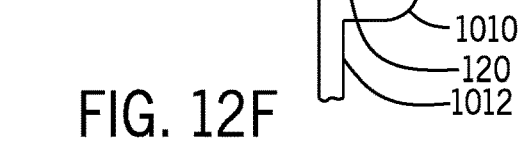
FIG. 12F is a schematic partial section view of a cover for a component of a vehicle interior engaged with a base of the component according to an exemplary embodiment.

According to an exemplary embodiment as shown schematically in FIG. 12F, door/cover 100 may be configured to engage with base 1010 to facilitate movement of cover 100 relative to base 1010 between a closed position and an open position. Extension 100e may be configured to engage base 1010 and the core may be configured to extend between first wall 1012 and second wall 1014 (see FIG. 2E). According to an exemplary embodiment, pins 120 may be configured to engage with base 1010.

Figure 13A:
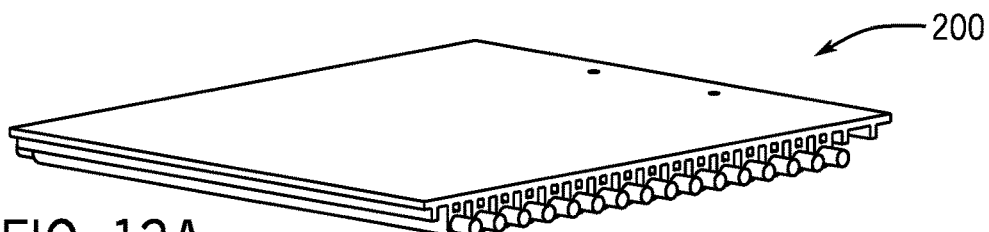
FIG. 13A is a schematic perspective view of a cover for a component of a vehicle interior according to an exemplary embodiment.
Figure 13B:
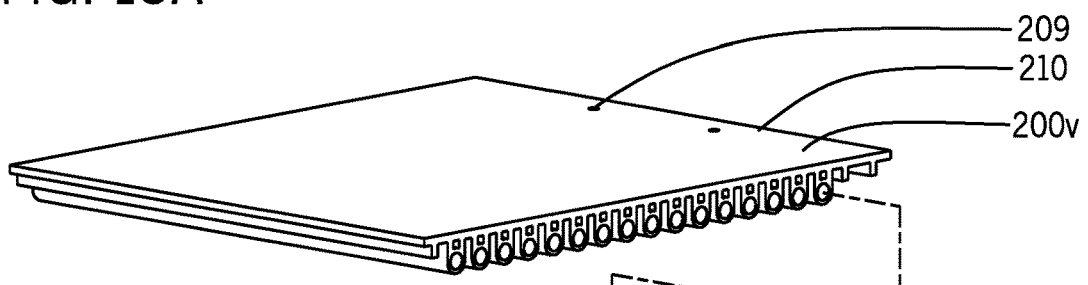
FIG. 13B is a schematic perspective exploded view of a cover for a component of a vehicle interior according to an exemplary embodiment.
Figure 13C:
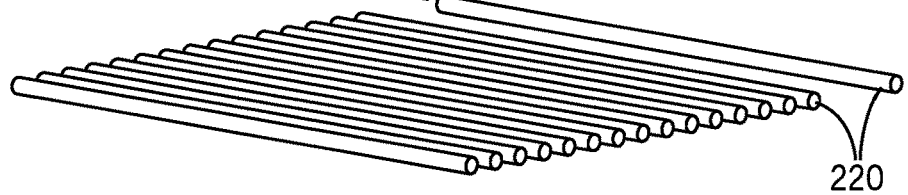
FIG. 13C is a schematic side view of a cover for a component of a vehicle interior according to an exemplary embodiment.
Figure 13D:
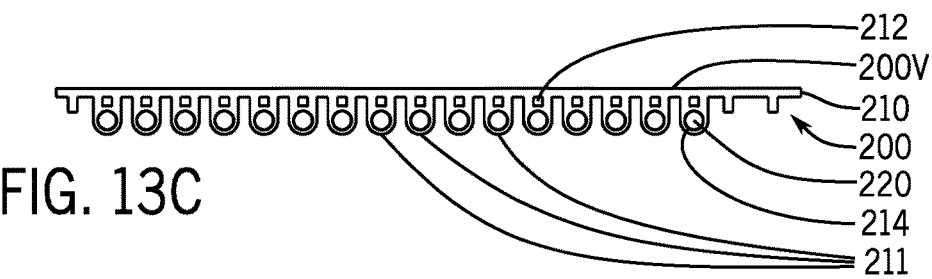
FIG. 13D is a schematic view of an extrusion die for forming a cover for a component of a vehicle interior according to an exemplary embodiment.

According to an exemplary embodiment as shown schematically in FIGS. 13A to 13C, a cover 200 (e.g. provided by or as a door, tambour door, door assembly, shade, blind, roller blind, etc.) is shown. As shown schematically in FIGS. 13A to 13C, cover 200 may comprise a visible surface 200v, a mounting aperture 209, a substrate 210, and pins 220 (e.g. extensions, projections, pegs, posts, features, etc.). As shown schematically in FIG. 13C, substrate 210 may comprise a series of substantially parallel ribs 211 and openings 214. According to an exemplary embodiment, mounting aperture 209 may be configured to receive a handle or similar structure to help facilitate movement of cover 200 from the closed position to the open position when cover 200 is coupled to base 1010. Substantially parallel ribs 211 may comprise apertures 212 between viable surface 200v and openings 214. According to an exemplary embodiment, substantially parallel ribs 211 may be configured to move relative to one another to facilitate bending of cover 200. According to an exemplary embodiment, pins 220 may be configured to be coupled to substrate 210 at openings 214 (see FIGS. 13B and 13E). According to an exemplary embodiment, pins 220 may be configured to pass entirely though substrate 210.

According to an exemplary embodiment, cover 200 may be formed by an extrusion process. A polymer material may be extruded through a tool/machine shown as comprising an extrusion die D2 in a direction substantially perpendicular to a direction of travel of the cover 200 when cover 200 is coupled to base 1010. As shown schematically in FIG. 13D, extrusion die D2 may be configured to allow the polymer material to pass through the cut out sections (see portions of FIG. 13D without cross hatching). Once the polymer passes through extrusion die D2 the material may begin to solidify (e.g. form, set/cure, dry and harden, etc.) on the opposite side of extrusion die D2 into substrate 210. According to an exemplary embodiment, visible surface 200v may be substantially flat and smooth as a result of the extrusion process and the presence of apertures 212.

Figure 13E:
FIG. 13E is a schematic partial perspective view of a cover for a component of a vehicle interior according to an exemplary embodiment.

According to an exemplary embodiment as shown schematically in FIG. 13E, pins 220 may be inserted into openings 214 of substrate 210 to form a core and an extension 200e. According to an exemplary embodiment, the core may comprise a first thickness and extension 200e may comprise a second thickness less than the first thickness. According to an exemplary embodiment, extension 200e may comprise a portion of pins 220.

Figure 13F:
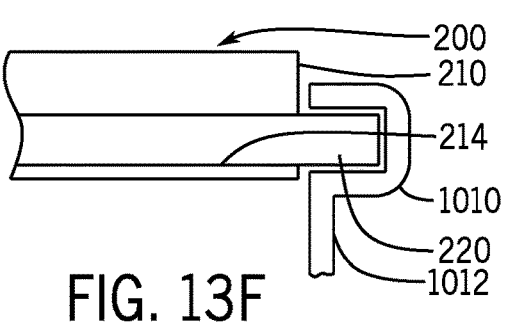
FIG. 13F is a schematic partial section view of a cover for a component of a vehicle interior engaged with a base of the component according to an exemplary embodiment.

According to an exemplary embodiment as shown schematically in FIG. 13F, door/cover 200 may be configured to engage with base 1010 to facilitate movement of cover 200 relative to base 1010 between a closed position and an open position. Extension 200e may be configured to engage base 1010 and the core may be configured to extend between first wall 1012 and second wall 1014 (see FIG. 2E). According to an exemplary embodiment, pins 220 may be configured to engage with base 1010.

Figure 14A:
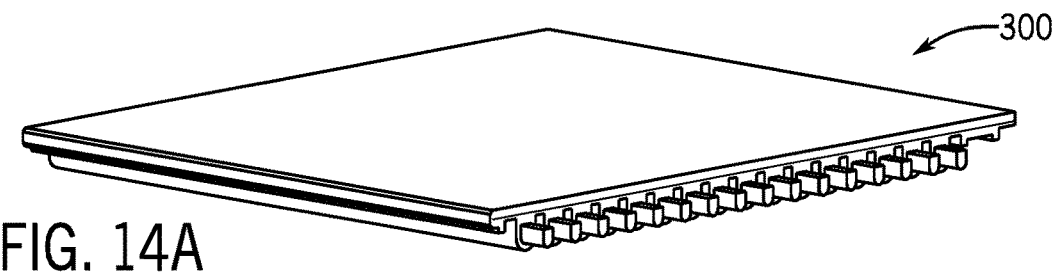
FIG. 14A is a schematic perspective view of a cover for a component of a vehicle interior according to an exemplary embodiment.
Figure 14B:
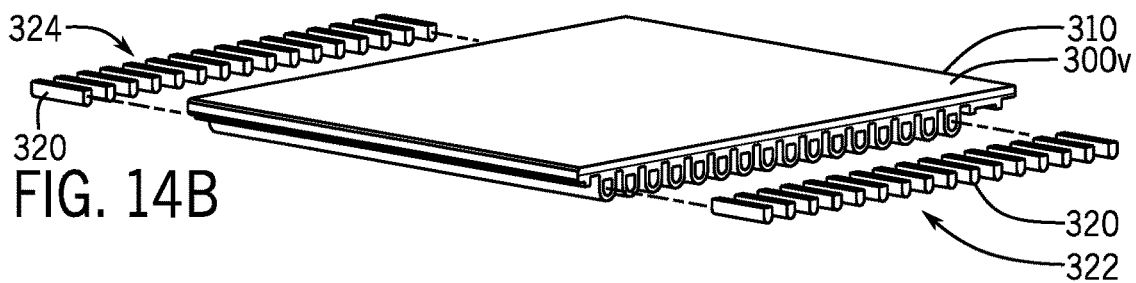
FIG. 14B is a schematic perspective exploded view of a cover for a component of a vehicle interior according to an exemplary embodiment.
Figure 14C:
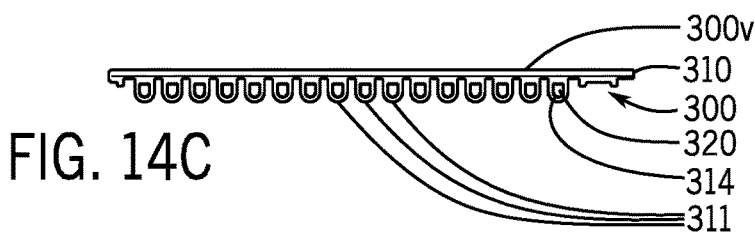
FIG. 14C is a schematic side view of a cover for a component of a vehicle interior according to an exemplary embodiment.
Figure 14D:
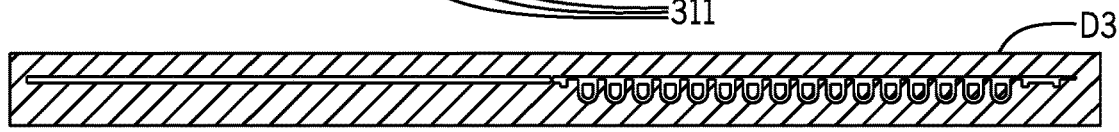
FIG. 14D is a schematic view of an extrusion die for forming a cover for a component of a vehicle interior according to an exemplary embodiment.

According to an exemplary embodiment as shown schematically in FIGS. 14A to 14C, a cover 300 (e.g. provided by or as a door, tambour door, door assembly, shade, blind, roller blind, etc.) is shown. As shown schematically in FIGS. 14A to 14C, cover 300 may comprise a visible surface 300v, a substrate 310, and pins 320 (e.g. extensions, projections, pegs, posts, features, etc.). As shown schematically in FIG. 14C, substrate 310 may comprise a first portion 310a, a second portion 310b (see FIG. 14E), a series of substantially parallel ribs 311 and openings 314. According to an exemplary embodiment as shown schematically in FIG. 14E, first portion 310a may comprise a top surface and a bottom surface and second portion 310b may comprise a top surface 310s. According to an exemplary embodiment, first portion 310a may be hinged to second portion 310b. According to an exemplary embodiment, the bottom surface of first portion 310a may be adjacent top surface 310s of the second portion. According to an exemplary embodiment, the bottom surface of first portion 310a may be bonded to top surface 310s of the second portion. According to an exemplary embodiment, the top surface of first portion 310a may comprise visible surface 300v and may face an interior of a vehicle.

According to an exemplary embodiment, substantially parallel ribs 311 may be configured to move relative to one another to facilitate bending of cover 300. According to an exemplary embodiment, pins 320 may be configured to be coupled to substrate 310 at openings 314 (see FIGS. 14B and 14F). According to an exemplary embodiment, pins 320 may comprise a first set of pins 322 and a second set of pins 324. According to an exemplary embodiment, each pin of first and second sets of pins 322 and 324 may comprise a first portion configured to couple each of the pins to openings 314 and a second portion configured to engage base 1010 (see FIGS. 14F and 14G).

According to an exemplary embodiment, cover 300 may be formed by an extrusion process. A polymer material may be extruded through a tool/machine shown as comprising an extrusion die D3 in a direction substantially perpendicular to a direction of travel of the cover 300 when cover 300 is coupled to base 1010. As shown schematically in FIG. 14D, extrusion die D3 may be configured to allow the polymer material to pass through the cut out sections (see portions of FIG. 14D without cross hatching). Once the polymer passes through extrusion die D3 the material may begin to solidify (e.g. form, set/cure, dry and harden, etc.) on the opposite side of extrusion die D3 into substrate 310.

Figure 14E:
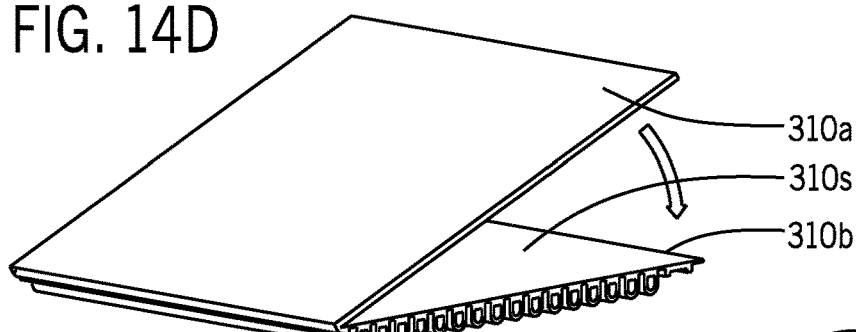
FIG. 14E is a schematic perspective view of a cover for a component of a vehicle interior according to an exemplary embodiment.
Figure 14F:
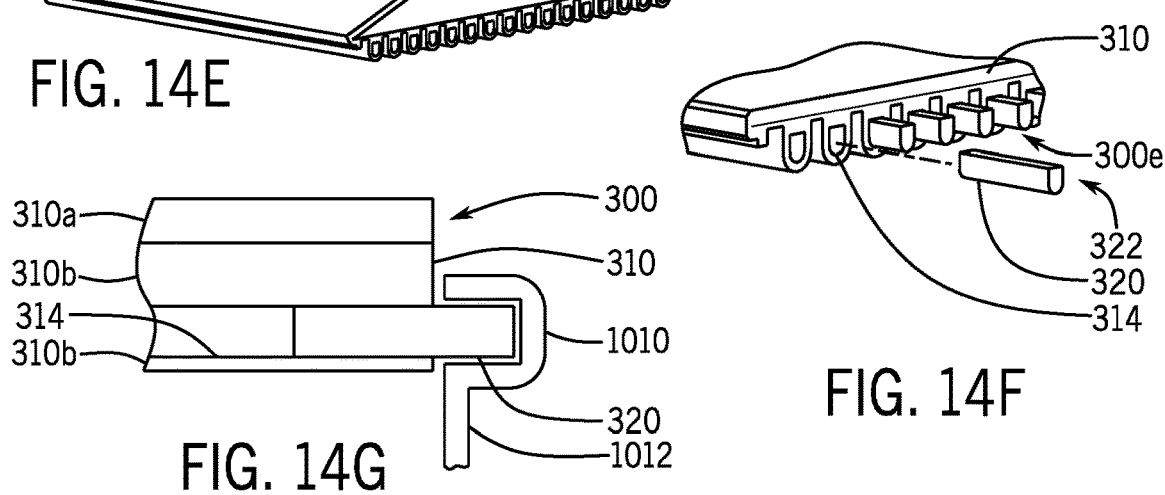
FIG. 14F is a schematic perspective partial view of a cover for a component of a vehicle interior according to an exemplary embodiment.

As shown schematically in FIG. 14E, first portion 310 may be rotated in a direction such that the bottom surface of first portion 310a may be adjacent to the top surface 310s of second portion 310b. According to an exemplary embodiment, the bottom surface of first portion 310a may be bonded to top surface 310s of the second portion. As shown schematically in FIG. 14F, pins 320 may be inserted into openings 314 of substrate 310 to form a core and an extension 300e. According to an exemplary embodiment, the core may comprise a first thickness and extension 300e may comprise a second thickness less than the first thickness. According to an exemplary embodiment, extension 300e may comprise a portion of pins 320.

Figure 14G:
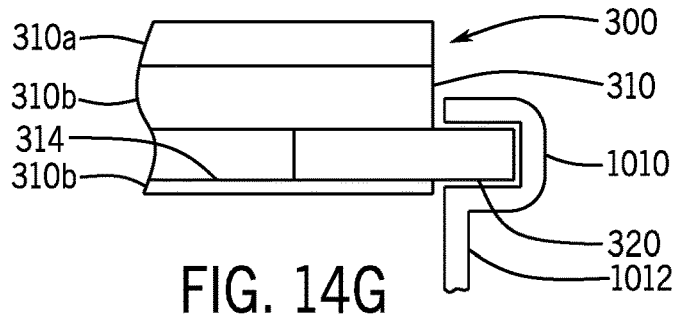
FIG. 14G is a schematic partial section view of a cover for a component of a vehicle interior engaged with a base of the component according to an exemplary embodiment.

According to an exemplary embodiment as shown schematically in FIG. 14G, door/cover 300 may be configured to engage with base 1010 to facilitate movement of cover 300 relative to base 1010 between a closed position and an open position. Extension 300e may be configured to engage base 1010 and the core may be configured to extend between first wall 1012 and second wall 1014 (see FIG. 2E). According to an exemplary embodiment, pins 320 may be configured to engage with base 1010.

Figure 15A:
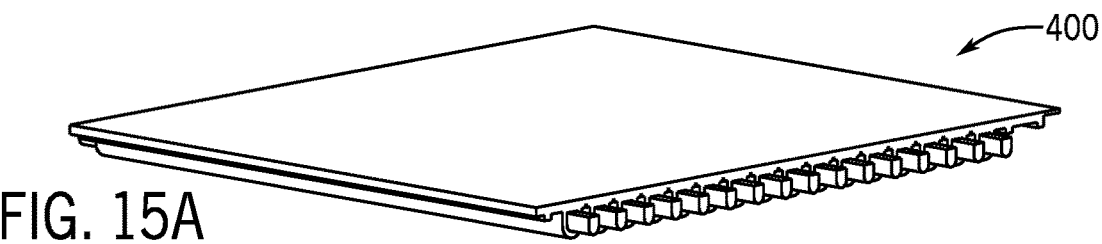
FIG. 15A is a schematic perspective view of a cover for a component of a vehicle interior according to an exemplary embodiment.
Figure 15B:
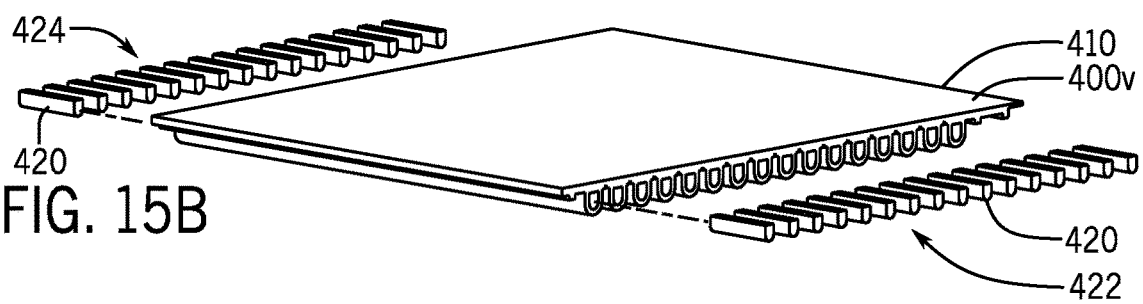
FIG. 15B is a schematic perspective exploded view of a cover for a component of a vehicle interior according to an exemplary embodiment.
Figure 15C:
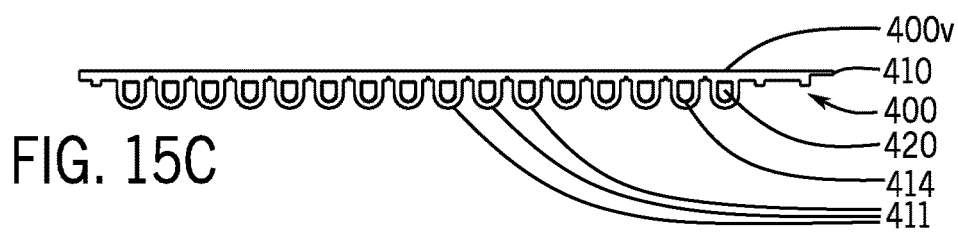
FIG. 15C is a schematic side view of a cover for a component of a vehicle interior according to an exemplary embodiment.
Figure 15D:
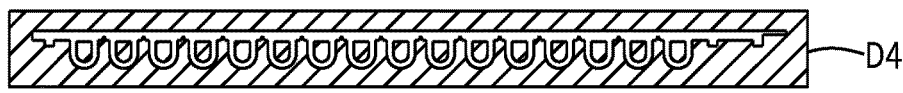
FIG. 15D is a schematic view of an extrusion die for forming a cover for a component of a vehicle interior according to an exemplary embodiment.
Figure 15E:
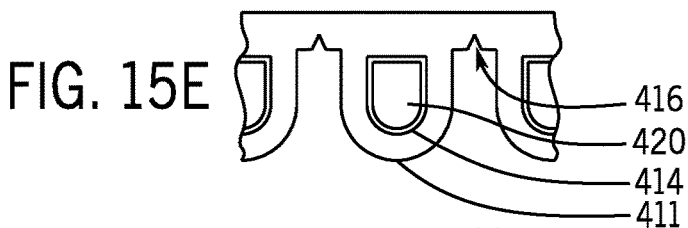
FIG. 15E is a schematic partial side view of a cover for a component of a vehicle interior according to an exemplary embodiment.

According to an exemplary embodiment as shown schematically in FIGS. 15A to 15C, a cover 400 (e.g. provided by or as a door, tambour door, door assembly, shade, blind, roller blind, etc.) is shown. As shown schematically in FIGS. 15A to 15C, cover 400 may comprise a visible surface 400v, a substrate 410, and pins 420 (e.g. extensions, projections, pegs, posts, features, etc.). As shown schematically in FIG. 15C, substrate 410 may comprise a series of substantially parallel ribs 411, openings 414, and notches 416. According to an exemplary embodiment, substantially parallel ribs 411 may be configured to move relative to one another to facilitate bending of cover 400. According to an exemplary embodiment as shown schematically in FIG. 15E, notches 416 may be between the substantially parallel ribs 411 and may be configured to further facilitate bending of cover 400 to a greater degree than the arrangement of the substantially parallel ribs 411 may provide alone. According to an exemplary embodiment, notches 416 may be omitted and bending of cover 400 may be facilitated solely by the configuration of substantially parallel ribs 411. According to an exemplary embodiment, pins 420 may be configured to be coupled to substrate 410 at openings 414 (see FIGS. 15B and 15F). According to an exemplary embodiment, pins 420 may comprise a first set of pins 422 and a second set of pins 424. According to an exemplary embodiment, each pin of first and second sets of pins 422 and 424 may comprise a first portion configured to couple each of the pins to openings 414 and a second portion configured to engage base 1010 (see FIGS. 15F and 15G).

According to an exemplary embodiment, cover 400 may be formed by an extrusion process. A polymer material may be extruded through a tool/machine shown as comprising an extrusion die D4 in a direction substantially perpendicular to a direction of travel of cover 400 when cover 400 is coupled to base 1010. As shown schematically in FIG. 15D, extrusion die D4 may be configured to allow the polymer material to pass through the cut out sections (see portions of FIG. 15D without cross hatching). Once the polymer material passes through extrusion die D4 the polymer material may begin to solidify (e.g. form, set/cure, dry and harden, etc.) on the opposite side of extrusion die D4 into substrate 410. According to an exemplary embodiment, visible surface 400v may be substantially flat and smooth as a result of the extrusion process.

Figures 15F, 15G:
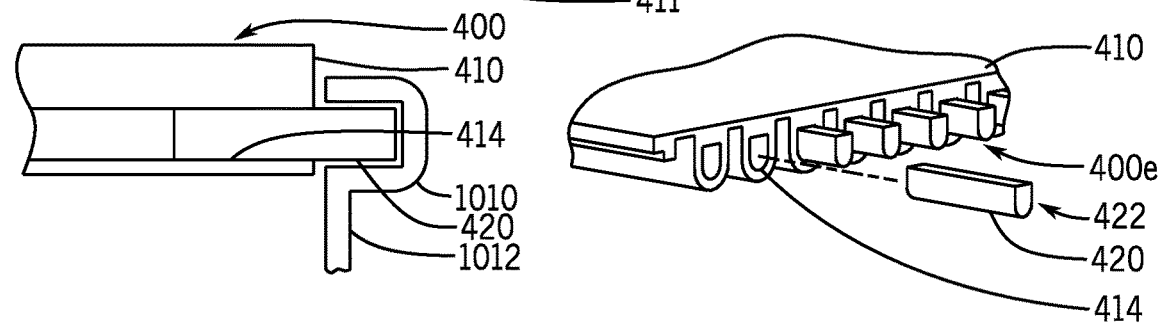
FIG. 15F is a schematic perspective partial view of a cover for a component of a vehicle interior according to an exemplary embodiment.
FIG. 15G is a schematic partial section view of a cover for a component of a vehicle interior engaged with a base of the component according to an exemplary embodiment.

According to an exemplary embodiment as shown schematically in FIG. 15F, pins 420 may be inserted into openings 414 of substrate 410 to form a core and an extension 400e. According to an exemplary embodiment, the core may comprise a first thickness and extension 400e may comprise a second thickness less than the first thickness. According to an exemplary embodiment, extension 400e may comprise a portion of pins 420.

According to an exemplary embodiment as shown schematically in FIG. 15G, door/cover 400 may be configured to engage with base 1010 to facilitate movement of cover 400 relative to base 1010 between a closed position and an open position. Extension 400e may be configured to engage base 1010 and the core may be configured to extend between first wall 1012 and second wall 1014 (see FIG. 2E). According to an exemplary embodiment, pins 420 may be configured to engage with base 1010.

Figure 16A:
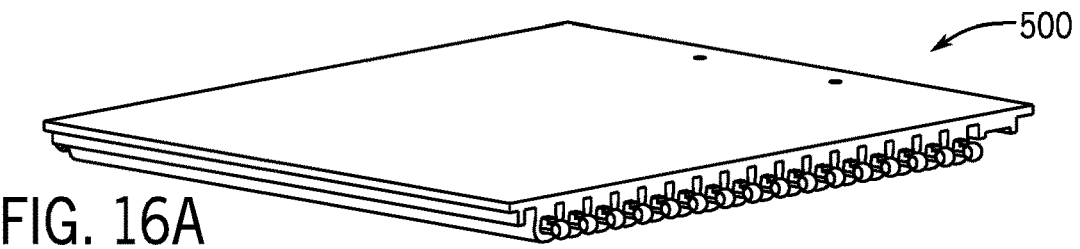
FIG. 16A is a schematic perspective view of a cover for a component of a vehicle interior according to an exemplary embodiment.
Figure 16B:
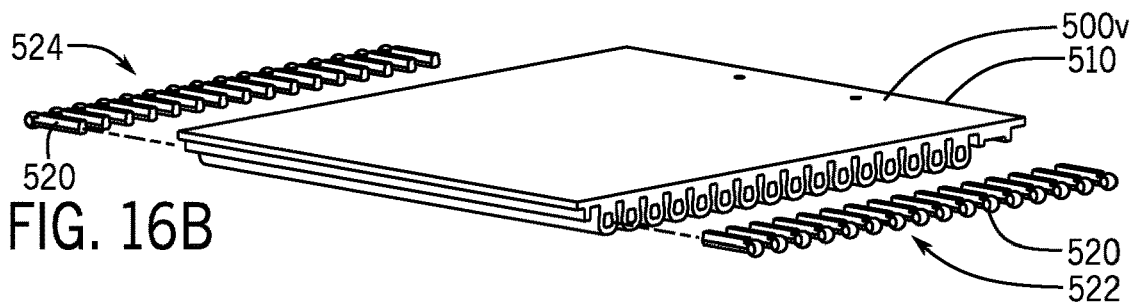
FIG. 16B is a schematic perspective exploded view of a cover for a component of a vehicle interior according to an exemplary embodiment.
Figure 16C:
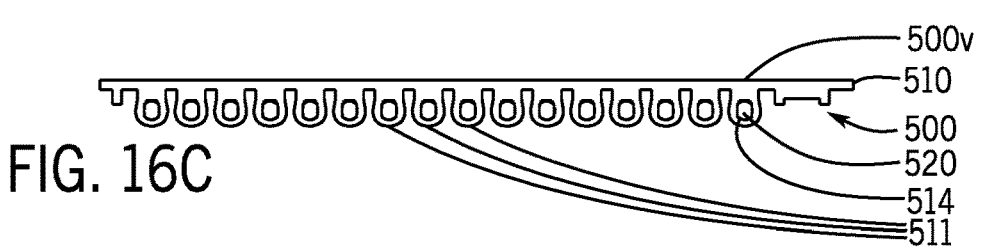
FIG. 16C is a schematic side view of a cover for a component of a vehicle interior according to an exemplary embodiment.
Figure 16D:
FIG. 16D is a schematic view of an extrusion die for forming a cover for a component of a vehicle interior according to an exemplary embodiment.
Figure 16E:
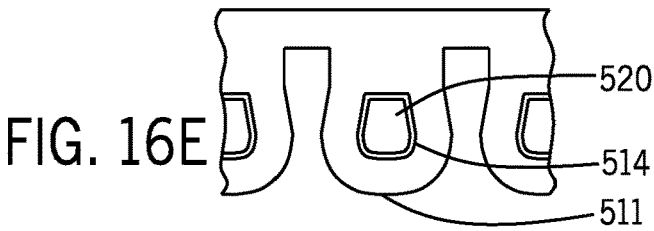
FIG. 16E is a schematic partial side view of a cover for a component of a vehicle interior according to an exemplary embodiment.

According to an exemplary embodiment as shown schematically in FIGS. 16A to 16C, a cover 500 (e.g. provided by or as a door, tambour door, door assembly, shade, blind, roller blind, etc.) is shown. As shown schematically in FIGS. 16A to 16C, cover 500 may comprise a visible surface 500v, a substrate 510, and pins 520 (e.g. extensions, projections, pegs, posts, features, etc.). As shown schematically in FIG. 16C, substrate 510 may comprise a series of substantially parallel ribs 511 and openings 514. According to an exemplary embodiment, substantially parallel ribs 511 may be configured to move relative to one another to facilitate bending of cover 500. According to an exemplary embodiment as shown schematically in FIGS. 16C and 16E, substantially parallel ribs 511 may be configured in a tear drop shape and openings 514 may be configured in a tear drop shape to optimize surface contact with pins 520. According to an exemplary embodiment, pins 520 may be configured to be coupled to substrate 510 at openings 514 (see FIGS. 16B and 16F). According to an exemplary embodiment, pins 520 may comprise a first set of pins 522 and a second set of pins 524. According to an exemplary embodiment, each pin of first and second sets of pins 522 and 524 may comprise a first portion 520a configured to couple each of the pins to openings 514 and a second portion 520b configured to engage base 1010 (see FIGS. 16F and 16G). According to an exemplary embodiment, second portion 520b may be substantially spherical.

According to an exemplary embodiment, cover 500 may be formed by an extrusion process. A polymer material may be extruded through a tool/machine shown as comprising an extrusion die D5 in a direction substantially perpendicular to a direction of travel of cover 500 when cover 500 is coupled to base 1010. As shown schematically in FIG. 16D, extrusion die D5 may be configured to allow the polymer material to pass through the cut out sections (see portions of FIG. 16D without cross hatching). Once the polymer material passes through extrusion die D5 the polymer material may begin to solidify (e.g. form, set/cure, dry and harden, etc.) on the opposite side of extrusion die D5 into substrate 510. According to an exemplary embodiment, visible surface 500v may be substantially flat and smooth as a result of the extrusion process.

Figure 16G:
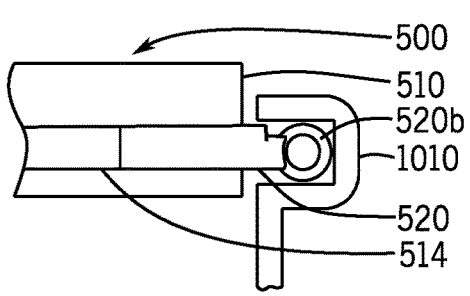
FIG. 16G is a schematic partial section view of a cover for a component of a vehicle interior engaged with a base of the component according to an exemplary embodiment.
Figure 16F:
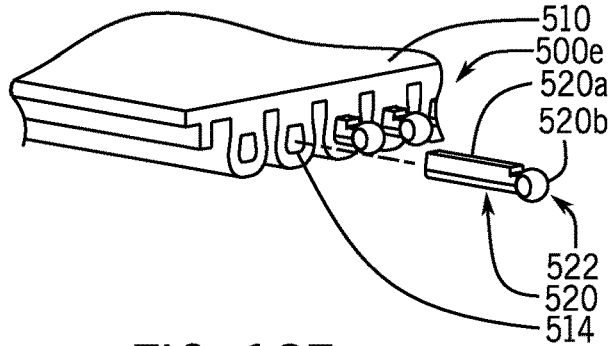
FIG. 16F is a schematic perspective partial view of a cover for a component of a vehicle interior according to an exemplary embodiment.

According to an exemplary embodiment as shown schematically in FIG. 16F, pins 520 may be inserted into openings 514 of substrate 510 to form a core and an extension 500e. According to an exemplary embodiment, the core may comprise a first thickness and extension 500e may comprise a second thickness less than the first thickness. According to an exemplary embodiment, extension 500e may comprise a portion of pins 520.

According to an exemplary embodiment as shown schematically in FIG. 16G, door/cover 500 may be configured to engage with base 1010 to facilitate movement of cover 500 relative to base 1010 between a closed position and an open position. Extension 500e may be configured to engage base 1010 and the core may be configured to extend between first wall 1012 and second wall 1014 (see FIG. 2E). According to an exemplary embodiment, pins 520 may be configured to engage with base 1010.

Figure 17A:
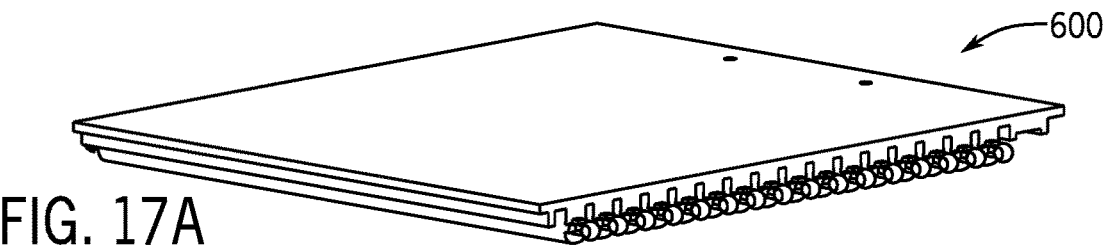
FIG. 17A is a schematic perspective view of a cover for a component of a vehicle interior according to an exemplary embodiment.
Figure 17B:
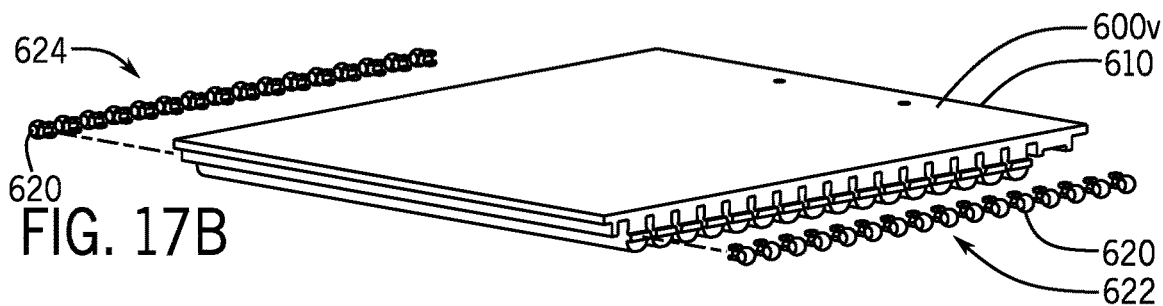
FIG. 17B is a schematic perspective exploded view of a cover for a component of a vehicle interior according to an exemplary embodiment.
Figure 17C:
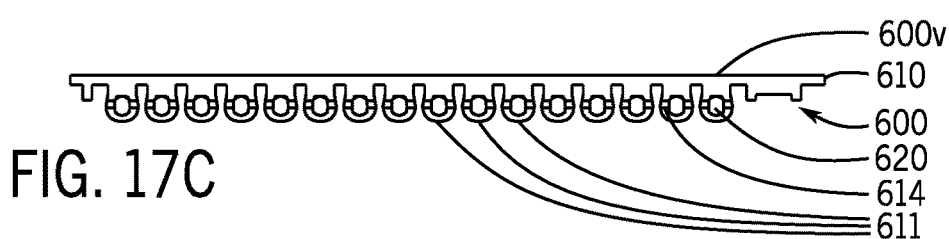
FIG. 17C is a schematic side view of a cover for a component of a vehicle interior according to an exemplary embodiment.

According to an exemplary embodiment shown schematically in FIGS. 17A to 17C, a cover 600 (e.g. provided by or as a door, tambour door, door assembly, shade, blind, roller blind, etc.) is shown. As shown schematically in FIGS. 17A to 17C, cover 600 may comprise a visible surface 600v, a substrate 610, and pins 620 (e.g. extensions, projections, pegs, posts, features, etc.). As shown schematically in FIG. 17C, substrate 610 may comprise a series of substantially parallel ribs 611 and protrusions 614. According to an exemplary embodiment, substantially parallel ribs 611 may be configured to move relative to one another to facilitate bending of cover 600. According to an exemplary embodiment as shown schematically in FIG. 17C, substantially parallel ribs 611 may be configured in a tear drop shape. According to an exemplary embodiment, pins 620 may be configured to be coupled to substrate 610 at protrusions 614 (see FIGS. 17B and 17G). According to an exemplary embodiment, pins 620 may comprise a first set of pins 622 and a second set of pins 624. According to an exemplary embodiment, each pin of first and second sets of pins 622 and 624 may comprise a first portion 620a configured to couple each of the pins to openings 614 and a second portion 620b configured to engage base 1010 (see FIG. 17H). According to an exemplary embodiment, the second portion 620b may be substantially spherical.

Figure 17D:
FIG. 17D is a schematic view of an extrusion die for forming a cover for a component of a vehicle interior according to an exemplary embodiment.
Figure 17E:
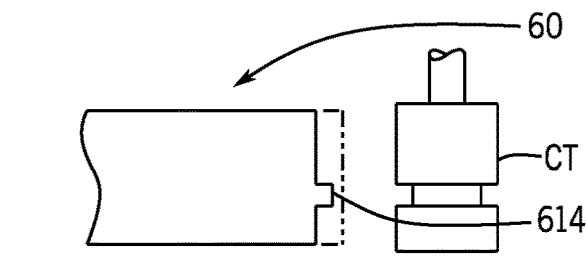
FIG. 17E is a schematic partial side view of a cover precursor for a component of a vehicle interior according to an exemplary embodiment.
Figure 17F:
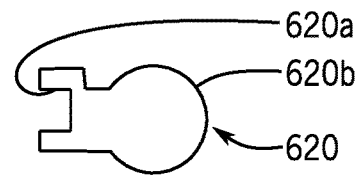
FIG. 17F is a schematic partial side view of a pin of a cover for a component of a vehicle interior according to an exemplary embodiment.
Figure 17G:
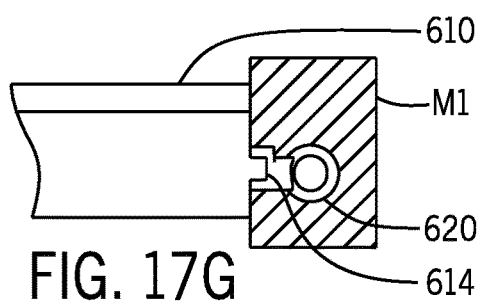
FIG. 17G is a schematic partial perspective view of a cover precursor for a component of a vehicle interior coupled to a mold for a pin of the cover for the component according to an exemplary embodiment.

According to an exemplary embodiment as shown schematically in FIGS. 17D, 17E and 17G, door/cover 600 may be formed by a combination of an extrusion process, a cutting process, and a molding process. A polymer material may be extruded through a tool/machine shown as comprising an extrusion die D6 in a direction substantially perpendicular to a direction of travel of cover 600 when cover 600 is coupled to base 1010. As shown schematically in FIG. 17D, extrusion die D6 may be configured to allow the polymer material to pass through the cut out sections (see portions of FIG. 17D without cross hatching). Once the polymer material passes through extrusion die D6 the polymer material may begin to solidify (e.g. form, set/cure, dry and harden, etc.) on the opposite side of extrusion die D6 into a precursor (e.g. section or segment of cover/door) 60 with a shape that generally matches substrate 610. According to an exemplary embodiment, visible surface 600*v* may be substantially flat and smooth as a result of the extrusion process.

According to an exemplary embodiment as shown schematically in FIG. 17E, cover precursor 60 may be cut with cutting tool CT to cut away portions of cover precursor 60 to form substrate 610 including protrusions 614. A mold M1 may be coupled to protrusions 614. Using mold M1, pins 620 may be over-molded directly on to protrusions 614 so as to divide substrate 610 into a core and an extension 600*e* (see FIG. 17H). According to an exemplary embodiment, the core may comprise a first thickness and extension 600*e* may comprise a second thickness less than the first thickness. According to an exemplary embodiment, extension 600*e* may comprise a portion of pins 620.

Figure 17H:
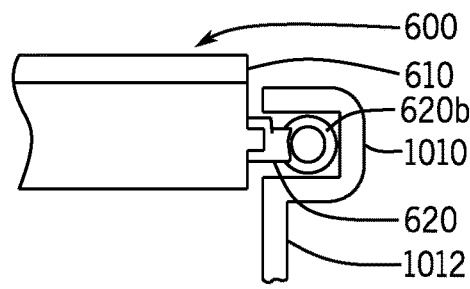
FIG. 17H is a schematic partial section view of a cover for a component of a vehicle interior engaged with a base of the component according to an exemplary embodiment.

According to an exemplary embodiment as shown schematically in FIG. 17H, cover 600 may be configured to engage with base 1010 to facilitate movement of cover 600 relative to base 1010 between a closed position and an open position. Extension 600*e* may be configured to engage base 1010 and the core may be configured to extend between first wall 1012 and second wall 1014 (see FIG. 2E). According to an exemplary embodiment, pins 620 may be configured to engage with base 1010.

According to an exemplary embodiment as shown schematically in FIGS. 18A to 18B, a cover 700 (e.g. provided by or as a door, tambour door, door assembly, shade, blind, roller blind, etc.) is shown. As shown schematically in FIGS. 18A to 18B, cover 700 may comprise a visible surface 700*v*, a substrate 710, and pins 720 (e.g. extensions, projections, pegs, posts, features, etc.). Pins 720 may be configured to facilitate bending of cover 700.

According to an exemplary embodiment as shown schematically in FIGS. 18C and 18D, cover 700 may be formed by a combination of an extrusion process and a cutting process (e.g. employing tooling, fixtures, etc.). A polymer material may be extruded through a tool/machine shown as comprising an extrusion die D7 in a direction substantially parallel to a direction of travel of cover 700 when cover 700 is coupled to base 1010. As shown schematically in FIG. 18C, extrusion die D7 may be configured to allow the polymer material to pass through the cut out sections (see portions of FIG. 18C without cross hatching). Once the polymer material passes through extrusion die D7 the polymer material may begin to solidify (e.g. form, set/cure, dry and harden, etc.) on the opposite side of extrusion die D7 into a precursor (e.g. section or segment of cover/door) 70 with a shape that generally matches a front view profile of substrate 710. According to an exemplary embodiment, visible surface 700*v* may be substantially flat and smooth as a result of the extrusion process.

According to an exemplary embodiment as shown schematically in FIG. 18D, cover precursor 70 may be cut with cutting tool CT to cut away portions of cover precursor 70 to form pins 720. According to an exemplary embodiment first portions 720*a* of pins 720 may be formed by cutting tool CT cutting away portions of substrate 710 to form second portions 720*b* of pins 720. As shown schematically in FIG. 18F, door/cover 700 may be configured to engage with base 1010 to facilitate movement of cover 700 relative to base 1010 between a closed position and an open position. According to an exemplary embodiment, first portions 720*a* may be configured to engage with base 1010.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:
1. A vehicle interior component comprising:
(a) a base providing a compartment with an opening;
(b) a door configured for movement relative to the base to an open position to facilitate access through the opening into the compartment of the base;
(c) a substrate comprising a set of extrusions;
(d) an interface between the base and the door configured to facilitate movement of the door relative to the base;
wherein the interface comprises a set of projections on the door configured to engage a set of guides on the base;

wherein the set of extrusions is formed by extruding a polymer material into a generally solid extrusion having a substantially flat top and a substantially rounded bottom;

wherein each projection of the set of projections is provided at each end of a generally solid extrusion;

wherein each projection of the set of projections comprises a substantially constant cross section.

2. The vehicle interior component of claim 1 wherein the set of projections is formed by extruding a polymer material in a direction substantially perpendicular to a path of movement of the door relative to the base.

3. The vehicle interior component of claim 1 wherein the set of projections is formed by extruding the polymer material into an extrusion comprising a generally cylindrical form having the cross section with the substantially flat top and the substantially rounded bottom.

4. The vehicle interior component of claim 1 wherein the door comprises a cover layer; wherein the substrate comprises a carrier structure providing the set of projections.

5. The vehicle interior component of claim 4 wherein the substrate comprises an extrusion; wherein the cover layer comprises an extrusion.

6. The vehicle interior component of claim 5 wherein the substrate and the cover layer are formed by co-extrusion.

7. The vehicle interior component of claim 4 wherein the cover layer is bonded to the substrate as the substrate is extruded.

8. The vehicle interior component of claim 4 wherein the substrate and cover layer are integrally formed.

9. The vehicle interior component of claim 4 wherein the cover layer is bonded to the substrate.

10. The vehicle interior component of claim 4 wherein the substrate comprises the set of projections; wherein the set of projections comprises a first projection and a second projection; wherein the cover layer couples the first projection to the second projection.

11. The vehicle interior component of claim 1 wherein the vehicle interior component comprises at least one of (a) a vehicle trim component; (b) a console; (c) a center console; (d) a floor console; (e) a storage compartment; (f) an arm rest.

12. A vehicle interior component comprising:
(a) a base providing a compartment with an opening;
(b) a door configured for movement relative to the base to an open position to facilitate access through the opening into the compartment of the base;
(c) a substrate comprising a carrier structure for the door comprising an interface between the base and the door configured to facilitate movement of the door relative to the base;
wherein the interface comprises a set of projections on the door configured to engage a set of guides on the base;
wherein the door comprises a cover layer on the substrate comprising the carrier structure for the door;
wherein the carrier structure comprises a set of structural ribs;
wherein the set of structural ribs is formed by extruding a polymer material into a generally solid extrusion having a substantially flat top and a substantially rounded bottom;
wherein each projection of the set of projections is provided at each end of a generally solid extrusion;
wherein the set of structural ribs comprises the set of projections configured to provide the interface;
wherein the substrate comprises the carrier structure with the set of structural ribs formed with the set of projections by extrusion.

13. The vehicle interior component of claim 12 wherein the substrate is bonded to the cover layer as the substrate is extruded.

14. The vehicle interior component of claim 12 wherein the process comprises the step of removing a portion of material to form the set of projections into a set of posts for the interface.

15. The vehicle interior component of claim 1 wherein the set of projections is formed by machining with a cutting tool.

16. The vehicle interior component of claim 1 wherein the door comprises a substrate and a cover comprising a cover layer.

17. The vehicle interior component of claim 16 constructed by providing a folded edge for the cover layer on the carrier structure.

18. The vehicle interior component of claim 16 wherein the set of projections of the carrier structure comprises a set of posts exposed when a portion of the cover is machined.

19. A vehicle interior component comprising:
(a) a base providing a compartment with an opening;
(b) a door configured for movement relative to the base to an open position to facilitate access through the opening into the compartment of the base;
(c) a carrier structure comprising an interface between the base and the door configured to facilitate movement of the door relative to the base;
wherein the carrier structure comprises a set of structural ribs configured to provide the interface;
wherein the interface comprises a set of projections on the door configured to engage a set of guides on the base;
wherein the set of structural ribs comprises a set of extrusions formed by extruding a polymer material into a generally solid extrusion having a substantially flat top and a substantially rounded bottom;
wherein each projection of the set of projections is provided at each end of a generally solid extrusion;
wherein the set of structural ribs of the carrier structure comprises the set of projections for the interface.

* * * * *